(12) United States Patent
Noguchi

(10) Patent No.: US 9,319,145 B2
(45) Date of Patent: Apr. 19, 2016

(54) OPTICAL TRANSMITTER, OPTICAL TRANSMISSION/RECEPTION SYSTEM, AND DRIVE CIRCUIT

(71) Applicant: NEC Corporation, Tokyo (JP)

(72) Inventor: Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 30 days.

(21) Appl. No.: 14/387,021

(22) PCT Filed: Nov. 6, 2012

(86) PCT No.: PCT/JP2012/007108
§ 371 (c)(1),
(2) Date: Sep. 22, 2014

(87) PCT Pub. No.: WO2013/140475
PCT Pub. Date: Sep. 26, 2013

(65) Prior Publication Data
US 2015/0063819 A1 Mar. 5, 2015

(30) Foreign Application Priority Data
Mar. 22, 2012 (JP) .................................. 2012-064768

(51) Int. Cl.
| H04B 10/556 | (2013.01) |
| H04B 10/548 | (2013.01) |
| H04B 10/40 | (2013.01) |
| G02F 1/01 | (2006.01) |
| G02F 1/21 | (2006.01) |

(52) U.S. Cl.
CPC ............ *H04B 10/548* (2013.01); *G02F 1/0121* (2013.01); *H04B 10/40* (2013.01); *G02F 2001/212* (2013.01); *G02F 2201/16* (2013.01)

(58) Field of Classification Search
CPC .................................................... H04B 10/5051
See application file for complete search history.

(56) References Cited

U.S. PATENT DOCUMENTS 7,848,659 B2 12/2010 Miura et al.
8,098,998 B2 1/2012 Takashima et al.
(Continued)

FOREIGN PATENT DOCUMENTS

| JP | 05-257102 | 10/1993 |
| JP | 05-289033 | 11/1993 |

(Continued)

OTHER PUBLICATIONS

International Search Report, PCT/JP2012/007108, Dec. 18, 2012.
(Continued)

*Primary Examiner* — Shi K Li
(74) *Attorney, Agent, or Firm* — Young & Thompson

(57) ABSTRACT

The present invention provides an optical transmitter, an optical transmission/reception system, and a drive circuit, which are capable of adjusting linearity of signal intensity of output light. The optical transmitter includes an optical transmission lines through which an optical signal propagates, phase modulation regions being formed on the optical transmission line. A decoder decodes an input digital signal and outputs signals according to a decoded value. A drive circuit outputs drive signals level of which is equal to or more than three to the each of the plurality of phase modulation regions based on the signals. A control circuit adjusts full-scale amplitude of each of the drive signals by controlling the drive circuit.

12 Claims, 17 Drawing Sheets

POSSIBILITY OF OCCURRENCE

(56) References Cited

U.S. PATENT DOCUMENTS

| | | |
|---|---|---|
| 2007/0065161 A1 | 3/2007 | Miura et al. |
| 2007/0212076 A1* | 9/2007 | Roberts ................ G02F 1/0121 398/183 |
| 2009/0060528 A1 | 3/2009 | Takashima et al. |

FOREIGN PATENT DOCUMENTS

| | | |
|---|---|---|
| JP | 07-13112 | 1/1995 |
| JP | 2007-082094 | 3/2007 |
| JP | 2008-292985 | 12/2008 |
| WO | WO 2011/043079 | 4/2011 |

OTHER PUBLICATIONS

Tomoaki Kato, Mineto Sato, Kenji Sato, Tomoyuki Yamase, Hidemi Noguchi, "InP MZ modulator with linear-accelerator-type tiny in-line centipede electrode structure for directly driving with CMOS-IC", IEICE Technical Report, Jun. 23, 2011, vol. 111, No. 111 (OPE2011 15-27), pp. 59 to 64.

* cited by examiner

| BINARY CODE | DAC51 | | DAC52 | | DAC53 | | DAC54 | | PHASE MODULATION AMOUNT (deg) | |
|---|---|---|---|---|---|---|---|---|---|---|
| | POSITIVE PHASE | NEGATIVE PHASE | POSITIVE PHASE | NEGATIVE PHASE | POSITIVE PHASE | NEGATIVE PHASE | POSITIVE PHASE | NEGATIVE PHASE | L1 | L2 |
| 0000 | 0 | 4 | 0 | 4 | 0 | 4 | 0 | 4 | 0 | 0 |
| 0001 | 1 | 3 | 0 | 4 | 0 | 4 | 0 | 4 | $\Delta\theta$ | $-\Delta\theta$ |
| 0010 | 2 | 2 | 0 | 4 | 0 | 4 | 0 | 4 | $2\Delta\theta$ | $-2\Delta\theta$ |
| 0011 | 3 | 1 | 0 | 4 | 0 | 4 | 0 | 4 | $3\Delta\theta$ | $-3\Delta\theta$ |
| 0100 | 4 | 0 | 0 | 4 | 0 | 4 | 0 | 4 | $4\Delta\theta$ | $-4\Delta\theta$ |
| 0101 | 4 | 0 | 1 | 3 | 0 | 4 | 0 | 4 | $5\Delta\theta$ | $-5\Delta\theta$ |
| 0110 | 4 | 0 | 2 | 2 | 0 | 4 | 0 | 4 | $6\Delta\theta$ | $-6\Delta\theta$ |
| 0111 | 4 | 0 | 3 | 1 | 0 | 4 | 0 | 4 | $7\Delta\theta$ | $-7\Delta\theta$ |
| 1000 | 4 | 0 | 4 | 0 | 0 | 4 | 0 | 4 | $8\Delta\theta$ | $-8\Delta\theta$ |
| 1001 | 4 | 0 | 4 | 0 | 1 | 3 | 0 | 4 | $9\Delta\theta$ | $-9\Delta\theta$ |
| 1010 | 4 | 0 | 4 | 0 | 2 | 2 | 0 | 4 | $10\Delta\theta$ | $-10\Delta\theta$ |
| 1011 | 4 | 0 | 4 | 0 | 3 | 1 | 0 | 4 | $11\Delta\theta$ | $-11\Delta\theta$ |
| 1100 | 4 | 0 | 4 | 0 | 4 | 0 | 0 | 4 | $12\Delta\theta$ | $-12\Delta\theta$ |
| 1101 | 4 | 0 | 4 | 0 | 4 | 0 | 1 | 3 | $13\Delta\theta$ | $-13\Delta\theta$ |
| 1110 | 4 | 0 | 4 | 0 | 4 | 0 | 2 | 2 | $14\Delta\theta$ | $-14\Delta\theta$ |
| 1111 | 4 | 0 | 4 | 0 | 4 | 0 | 3 | 1 | $15\Delta\theta$ | $-15\Delta\theta$ |

Fig. 3

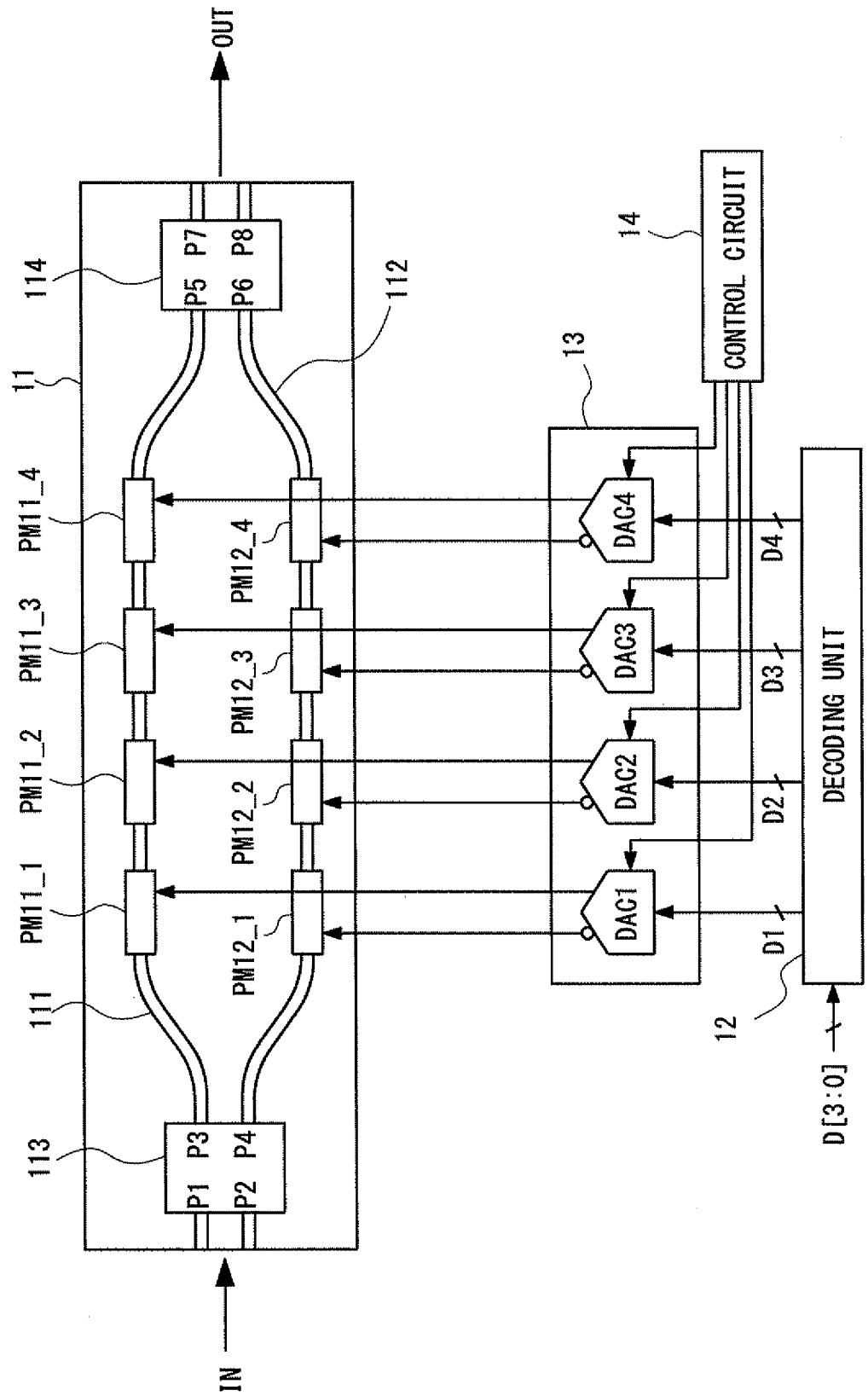

| BINARY CODE | DAC1 POSITIVE PHASE | DAC1 NEGATIVE PHASE | DAC2 POSITIVE PHASE | DAC2 NEGATIVE PHASE | DAC3 POSITIVE PHASE | DAC3 NEGATIVE PHASE | DAC4 POSITIVE PHASE | DAC4 NEGATIVE PHASE | PHASE MODULATION AMOUNT (deg) L1 | PHASE MODULATION AMOUNT (deg) L2 |
|---|---|---|---|---|---|---|---|---|---|---|
| 0000 | W1×0 | W1×4 | W2×0 | W2×4 | W3×0 | W3×4 | W4×0 | W4×4 | 0 | 0 |
| 0001 | W1×1 | W1×3 | W2×0 | W2×4 | W3×0 | W3×4 | W4×0 | W4×4 | W1$\Delta\theta$ | $-$W1$\Delta\theta$ |
| 0010 | W1×2 | W1×2 | W2×0 | W2×4 | W3×0 | W3×4 | W4×0 | W4×4 | 2×W1$\Delta\theta$ | $-$2×W1$\Delta\theta$ |
| 0011 | W1×3 | W1×1 | W2×0 | W2×4 | W3×0 | W3×4 | W4×0 | W4×4 | 3×W1$\Delta\theta$ | $-$3×W1$\Delta\theta$ |
| 0100 | W1×4 | W1×0 | W2×0 | W2×4 | W3×0 | W3×4 | W4×0 | W4×4 | 4×W1$\Delta\theta$ | $-$4×W1$\Delta\theta$ |
| 0101 | W1×4 | W1×0 | W2×1 | W2×3 | W3×0 | W3×4 | W4×0 | W4×4 | (4×W1+W2)$\Delta\theta$ | $-$(4×W1+W2)$\Delta\theta$ |
| 0110 | W1×4 | W1×0 | W2×2 | W2×2 | W3×0 | W3×4 | W4×0 | W4×4 | (4×W1+2×W2)$\Delta\theta$ | $-$(4×W1+2×W2)$\Delta\theta$ |
| 0111 | W1×4 | W1×0 | W2×3 | W2×1 | W3×0 | W3×4 | W4×0 | W4×4 | (4×W1+3×W2)$\Delta\theta$ | $-$(4×W1+3×W2)$\Delta\theta$ |
| 1000 | W1×4 | W1×0 | W2×4 | W2×0 | W3×0 | W3×4 | W4×0 | W4×4 | (4×W1+4×W2)$\Delta\theta$ | $-$(4×W1+4×W2)$\Delta\theta$ |
| 1001 | W1×4 | W1×0 | W2×4 | W2×0 | W3×1 | W3×3 | W4×0 | W4×4 | {4(W1+W2)+W3}$\Delta\theta$ | $-${4(W1+W2)+W3}$\Delta\theta$ |
| 1010 | W1×4 | W1×0 | W2×4 | W2×0 | W3×2 | W3×2 | W4×0 | W4×4 | {4(W1+W2)+2×W3}$\Delta\theta$ | $-${4(W1+W2)+2×W3}$\Delta\theta$ |
| 1011 | W1×4 | W1×0 | W2×4 | W2×0 | W3×3 | W3×1 | W4×0 | W4×4 | {4(W1+W2)+3×W3}$\Delta\theta$ | $-${4(W1+W2)+3×W3}$\Delta\theta$ |
| 1100 | W1×4 | W1×0 | W2×4 | W2×0 | W3×4 | W3×0 | W4×0 | W4×4 | 4(W1+W2+W3)$\Delta\theta$ | $-$4(W1+W2+W3)$\Delta\theta$ |
| 1101 | W1×4 | W1×0 | W2×4 | W2×0 | W3×4 | W3×0 | W4×1 | W4×3 | {4(W1+W2+W3)+W4}$\Delta\theta$ | $-${4(W1+W2+W3)+W4}$\Delta\theta$ |
| 1110 | W1×4 | W1×0 | W2×4 | W2×0 | W3×4 | W3×0 | W4×2 | W4×2 | {4(W1+W2+W3)+2×W4}$\Delta\theta$ | $-${4(W1+W2+W3)+2×W4}$\Delta\theta$ |
| 1111 | W1×4 | W1×0 | W2×4 | W2×0 | W3×4 | W3×0 | W4×3 | W4×1 | {4(W1+W2+W3)+3×W4}$\Delta\theta$ | $-${4(W1+W2+W3)+3×W4}$\Delta\theta$ |

Fig. 8

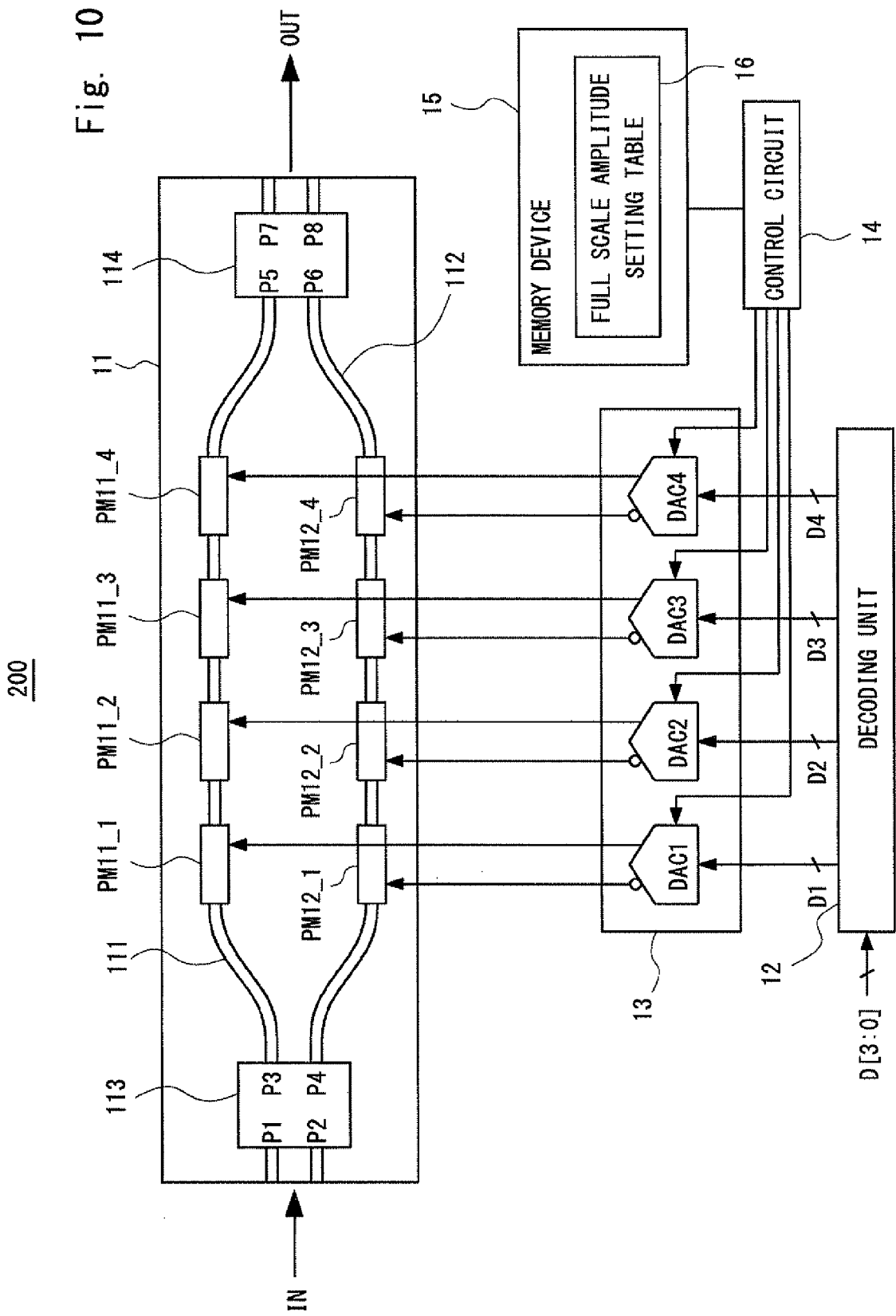

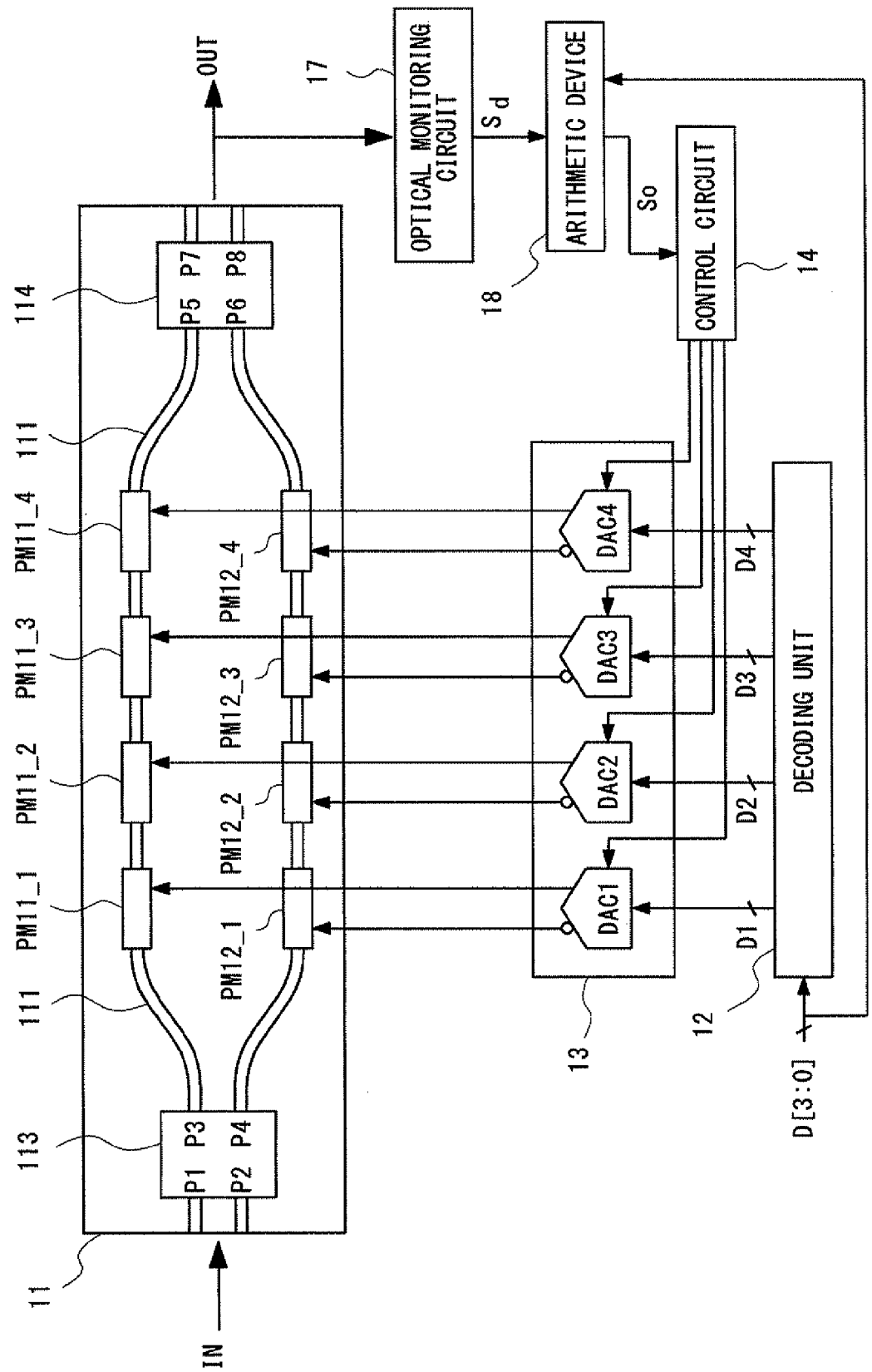

OPTICAL TRANSMITTER, OPTICAL TRANSMISSION/RECEPTION SYSTEM, AND DRIVE CIRCUIT

TECHNICAL FIELD

The present invention relates to an optical transmitter, an optical transmission/reception system, and a drive circuit, and more particularly, to an optical transmitter, an optical transmission/reception system, and a drive circuit, which perform multilevel modulation.

BACKGROUND ART

With an explosive increase in demand of a broadband multimedia communication service such as the Internet or a high-definition digital TV broadcast, a dense wavelength-division multiplexing optical fiber communication system, which is suitable for a long-distance and large-capacity transmission and is highly reliable, has been introduced in trunk line networks and metropolitan area networks. In access networks, an optical fiber access service spreads rapidly. In such an optical fiber communication system, cost reduction for laying optical fibers as optical transmission lines and improvement of spectral efficiency per optical fiber are important. Therefore, a wavelength-division multiplexing technology which multiplexes multiple optical signals having different wavelengths is widely used.

In an optical transmitter for such a high-capacity wavelength-division multiplexing communication system, an optical modulator is required. In the optical modulator, high speed operation with small wavelength dependence is indispensable. Further, an unwanted optical phase modulation component which degrades the waveform of the received optical signal after long-distance transmission (in the case of using optical intensity modulation as a modulation method), or an optical intensity modulation component (in the case of using optical phase modulation as a modulation method) should be suppressed as small as possible. A Mach-Zehnder (MZ) optical intensity modulator in which waveguide-type optical phase modulators are embedded into an optical waveguide-type MZ interferometer is suitable for such a use.

To increase the transmission capacity per wavelength channel, a multilevel optical modulation signal system having a smaller optical modulation spectrum bandwidth than a typical binary optical intensity modulation system is advantageous in terms of the spectral efficiency, wavelength dispersion of an optical fiber, and resistance to polarization mode dispersion, each of which poses a problem. This multilevel optical modulation signal system is considered to become mainstream particularly in optical fiber communication systems in trunk line networks exceeding 40 Gb/s, the demand for which is expected to increase in the future. For such use, a monolithically integrated multilevel optical modulator in which two MZ optical intensity modulators described above and an optical multiplexer/demultiplexer are used in combination has recently been developed.

In high speed optical modulation by using this optical modulator, especially in the high-frequency region in which the frequency of a modulation electric signal is over 1 GHz, the propagating wavelength of the modulation electric signal becomes not negligibly short compared with the length of an electrode formed in an optical phase modulator region in the optical modulator. Therefore, voltage distribution of the electrode serving as means for applying an electric field to the optical phase modulator is no longer regarded as uniform in an optical signal propagation axis direction. To estimate optical modulation characteristics exactly, it is required to treat the electrode as a distributed constant line and treat the modulation electric signal propagating through the optical phase modulator region as a traveling-wave, respectively. In that case, in order to increase the effective interaction length with the modulated optical signal and the modulation electric signal, a so-called traveling-wave type electrode which is devised to make a phase velocity vo of the modulated optical signal and a phase velocity vm of the modulation electric signal as close to each other as possible (phase velocity matching) is required.

An optical modulator module having a segmented electrode structure to realize the traveling-wave type electrode and the multilevel optical modulation signal system has already been proposed (Patent Literature 1 to 4). An optical modulator module capable of performing multilevel control of a phase variation of a modulated optical signal in each segmented electrode has also been proposed. This optical modulator module is a compact, broad-band, and low-drive-voltage optical modulator module capable of generating any multilevel optical modulation signal, while maintaining phase velocity matching and impedance matching, which are required for a traveling-wave structure operation, by inputting a digital signal.

CITATION LIST

Patent Literature

Patent Literature 1: Japanese Unexamined Patent Application Publication No. H07-13112
Patent Literature 2: Japanese Unexamined Patent Application Publication No. H05-289033
Patent Literature 3: Japanese Unexamined Patent Application Publication No. H05-257102
Patent Literature 4: International Patent Publication No. WO 2011/043079

SUMMARY OF INVENTION

Technical Problem

However, the present inventor has found that the above-mentioned optical modulator module has the following problem. In the segmented electrode structure, the number of the segmented electrodes to be provided is limited, so that there is a problem being difficult to perform a large-scale multilevel modulation.

In theory, in the segmented electrode structure, value multiplexing corresponding to the number of segmented electrodes can be achieved by increasing the number of segmented electrodes. Additionally, further multiplexing can be performed, when phase variation of the modulated optical signal in each segmented electrode is multilevely controlled. However, the number of segmented electrodes mountable on the optical modulator module to be actually prepared is limited depending on the size of the optical modulator. Accordingly, the number of levels of the multilevel modulation is limited in practice, and it is difficult to achieve the optical modulator module that can perform the large-scale multilevel modulation.

In this regard, the signal to be applied to each segmented electrode can be multileveled. However, spacing of levels of signal intensity of modulated output light is uneven, when changing the phase at regular intervals. Thus, the linearity of the signal intensity of the output light with respect to an input digital signal cannot be ensured. Therefore, providing a function capable of adjusting the linearity of the signal intensity of the output light is needed to operate a multilevel modulating optical transmitter including the segmented electrode structure described above.

The present invention has been made in view of the above-mentioned problem, and an object of the present invention is to provide an optical transmitter, an optical transmission/reception system, and a drive circuit, which are capable of adjusting linearity of signal intensity of output light.

Solution to Problem

An optical transmitter according to an exemplary aspect of the present invention includes: an optical modulator that includes an optical transmission line through which an optical signal propagates, a plurality of phase modulation regions being formed on the optical transmission line; a decoder that decodes an input digital signal and outputs a signal according to a decoded value; a drive circuit that outputs a drive signal to the each of the plurality of phase modulation regions based on the signal according to a decoded value, level of the drive signal being equal to or more than three; and a control circuit that adjusts full-scale amplitudes of the plurality of the drive signals by controlling the drive circuit.

An optical transmission/reception system according to an exemplary aspect of the present invention includes: an optical transmitter that transmits an optical signal; a transmission line in which the optical signal propagates; an optical receiver that receives the optical signal through the transmission line, the optical transmitter comprises: an optical modulator that includes an optical transmission line through which the optical signal propagates, a plurality of phase modulation regions being formed on the optical transmission line; a decoder that decodes an input digital signal and outputs a signal according to a decoded value; a drive circuit that outputs a drive signal to the each of the plurality of phase modulation regions based on the signal according to a decoded value, level of the drive signal being equal to or more than three; and a control circuit that adjusts full-scale amplitudes of the plurality of the drive signals by controlling the drive circuit.

A drive circuit according to an exemplary aspect of the present invention includes a plurality of DACs that output drive signals to each of a plurality of phase modulation regions formed in an optical waveguide provided in an optical modulator based on a signal according to a decoded value of an input digital signal, levels of the drive signals are equal to or more than three, the DAC being capable of adjusting full-scale amplitude thereof according to a control signal from outside.

Advantageous Effects of Invention

According to the present invention, it is possible to provide an optical transmitter, an optical transmission/reception system, and a drive circuit, which are capable of adjusting linearity of signal intensity of output light.

BRIEF DESCRIPTION OF DRAWINGS

FIG. 3 is an operation table showing operations of the optical transmitter 500;

FIG. 6 is a block diagram schematically showing a configuration of an optical transmitter 100 according to a first exemplary embodiment;

FIG. 8 is an operation table showing operations of the optical transmitter 100 according to the first exemplary embodiment;

FIG. 10 is a block diagram schematically showing a configuration of an optical transmitter 200 according to a second exemplary embodiment;

FIG. 11 is a block diagram schematically showing a configuration of an optical transmitter 300 according to a third exemplary embodiment;

DESCRIPTION OF EMBODIMENTS

Figure 1:
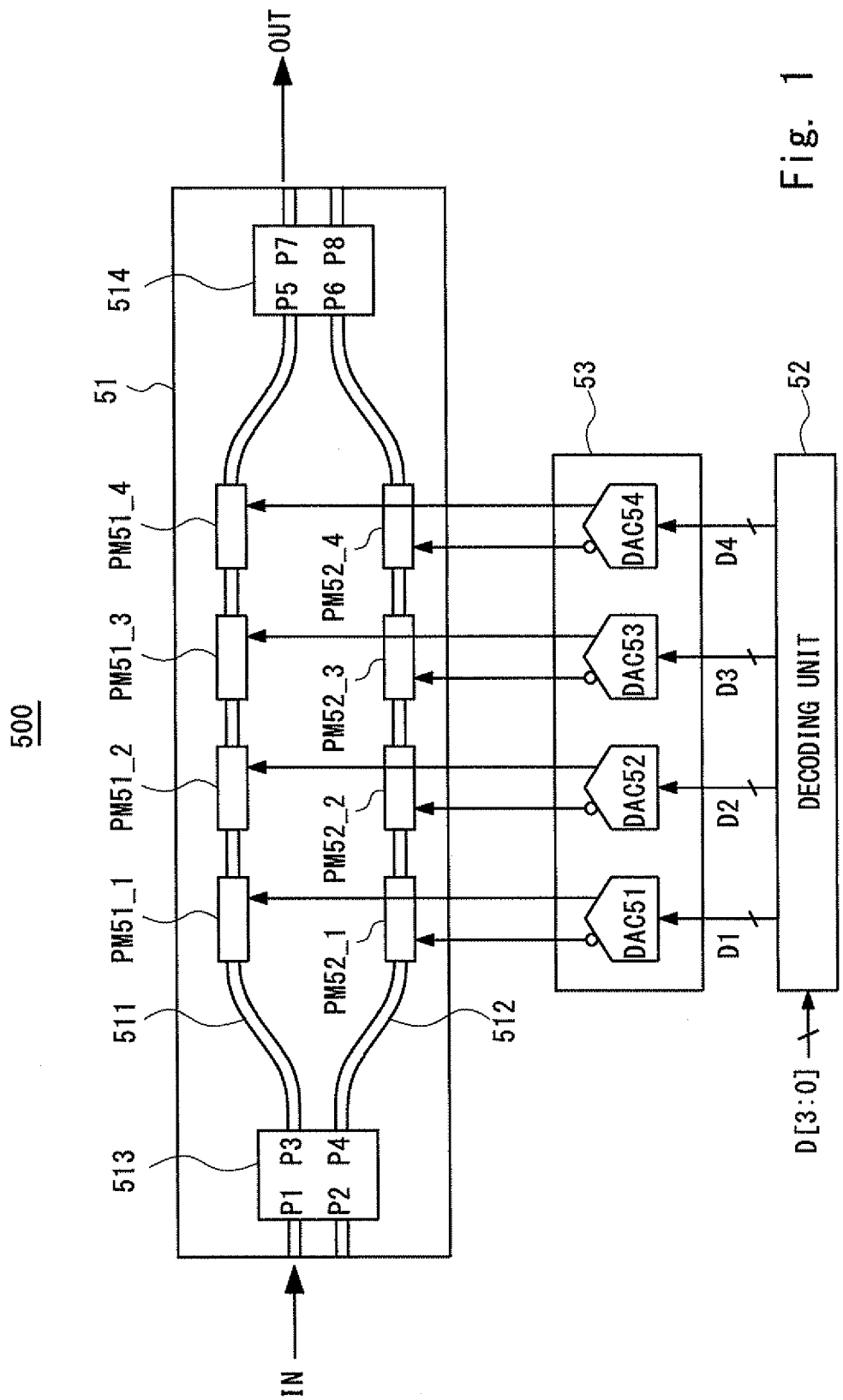
FIG. 1 is a block diagram schematically showing a configuration of a multilevel optical transmitter 500 having a typical segmented electrode structure.

Exemplary embodiments of the present invention will be described below with reference to the drawings. In the drawings, the same elements are denoted by the same reference numerals, and a redundant explanation is omitted as needed.

As a prerequisite for understanding the configuration and operation of each optical transmitter according to exemplary embodiments described below, a multilevel optical transmitter 500 having a typical segmented electrode structure will be described. The optical transmitter 500 is a multilevel modulation optical transmitter. In this case, however, to simplify the explanation, the optical transmitter 500 will be described as a 4-bit optical transmitter. FIG. 1 is a block diagram schematically showing the configuration of the multilevel optical transmitter 500 having a typical segmented electrode structure. The optical transmitter 500 includes an optical modulator 51, a decoder 52, and a drive circuit 53.

The optical modulator 51 outputs output light OUT which is obtained by modulating input light IN. The optical modulator 51 includes optical waveguides 511 and 512, optical multiplexers/demultiplexers 513 and 514, and phase modulation regions PM51_1 to PM51_4 and PM52_1 to PM52_4. The optical waveguides 511 and 512 are arranged in parallel.

The optical multiplexer/demultiplexer 153 is disposed at the optical signal input (input light IN) side of the optical waveguides 511 and 512. At the input side of the optical multiplexer/demultiplexer 513, the input light IN is input to an input port P1, and an input port P2 has no input. At the output side of the optical multiplexer/demultiplexer 513, the optical waveguide 511 is connected to an output port P3 and the optical waveguide 512 is connected to an output port P4.

Figure 2A:
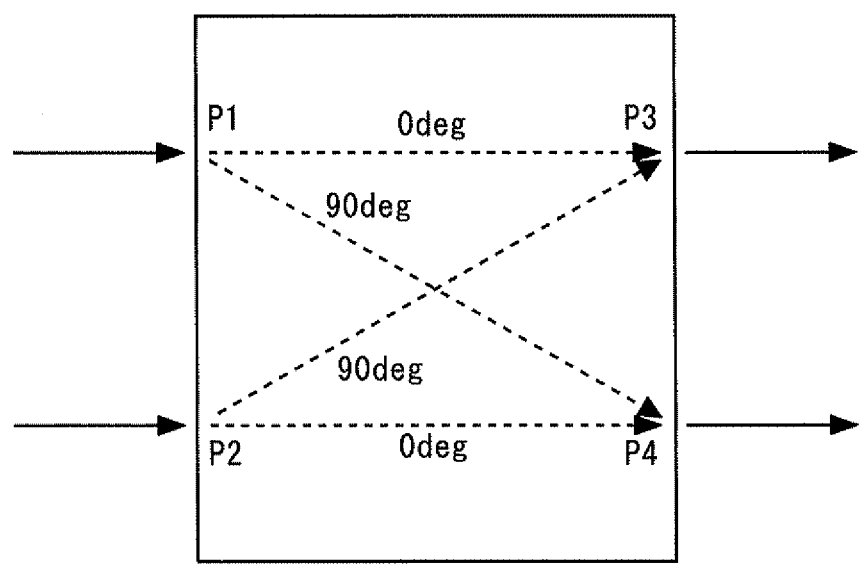
FIG. 2A is a diagram schematically showing a configuration of an optical multiplexer/demultiplexer 513.

FIG. 2A is a diagram schematically showing the configuration of the optical multiplexer/demultiplexer 513. In the optical multiplexer/demultiplexer 513, the light which has entered the input port P1 propagates to the output ports P3 and P4; however, the light propagating from the input port P1 to the output port P4 has a phase that is delayed by 90° relative to the light propagating from the input port P1 to the output port P3. The light which has entered the input port P2 propagates to the output ports P3 and P4; however, the light propagating from the input port P2 to the output port P3 has a phase that is delayed by 90° relative to the light propagating from the input port P2 to the output port P4.

The optical multiplexer/demultiplexer 514 is disposed at the optical signal output (output light OUT) side of the optical waveguides 511 and 512. At the input side of the optical multiplexer/demultiplexer 514, the optical waveguide 511 is connected to an input port P5 and the optical waveguide 512 is connected to an input port P6. At the output side of the optical multiplexer/demultiplexer 514, the output light OUT is output from an output port P7.

Figure 2B:
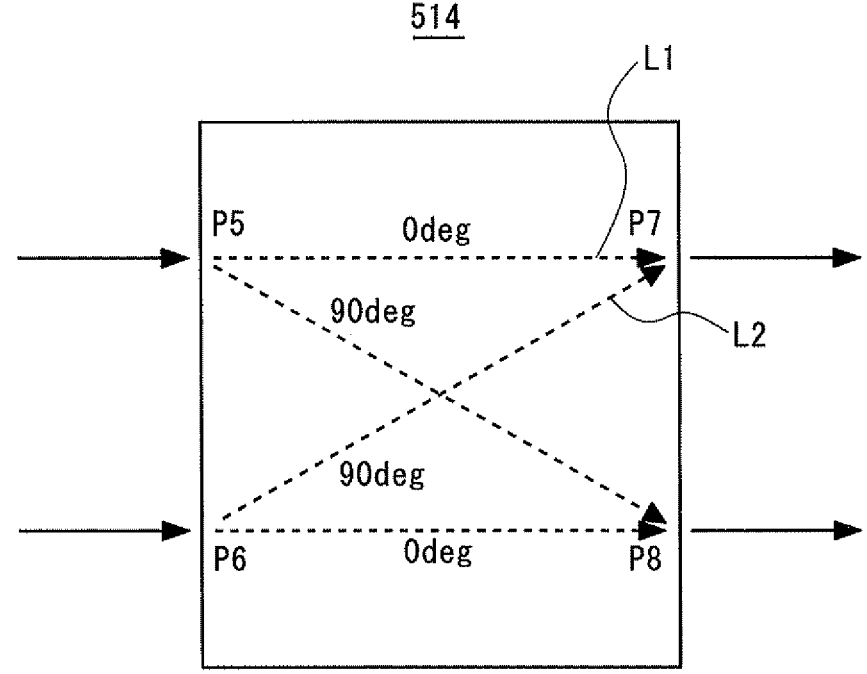
FIG. 2B is a diagram schematically showing a configuration of an optical multiplexer/demultiplexer 514.

FIG. 2B is a diagram schematically showing the configuration of the optical multiplexer/demultiplexer 514. The optical multiplexer/demultiplexer 514 has a configuration similar to that of the optical multiplexer/demultiplexer 513. The input ports P5 and P6 respectively correspond to the input ports P1 and P2 of the optical multiplexer/demultiplexer 513. The output ports P7 and P8 respectively correspond to the output ports P3 and P4 of the optical multiplexer/demultiplexer 513. The light which has entered the input port P5 propagates to the output ports P7 and P8; however, the light propagating from the input port P5 to the output port P8 has a phase that is delayed by 90° relative to the light propagating from the input port P5 to the output port P7. The light which has entered the input port P6 propagates to the output ports P7 and P8; however, the light propagating from the input port P6 to the output port P7 has a phase that is delayed by 90° relative to the light propagating from the input port P6 to the output port P8.

The phase modulation regions PM51_1 to PM51_4 are arranged on the optical waveguide 511 between the optical multiplexer/demultiplexer 513 and the optical multiplexer/demultiplexer 514. The phase modulation regions PM52_1 to PM52_4 are arranged on the optical waveguide 512 between the optical multiplexer/demultiplexer 513 and the optical multiplexer/demultiplexer 514.

The term "phase modulation region" used herein refers to a region including an electrode formed on the optical waveguide. When an electric signal such as a voltage signal is applied to the electrode, the effective refractive index of the optical waveguide under the electrode changes. As a result, the substantial optical path length of the optical waveguide of the phase modulation region can be changed. This allows the phase modulation region to change the phase of the optical signal propagating through the optical waveguide. Further, the optical signal can be modulated by applying a phase difference between the optical signals propagating through the two optical waveguides 511 and 512. That is, the optical modulator 51 forms a multilevel Mach-Zehnder optical modulator having two arms and an electrode segmented structure.

The decoder 52 decodes 4-bit input digital signals D[3:0], and outputs, for example, multi-bit signals D1 to D4, to the drive circuit 53.

The drive circuit 53 includes five-value D/A converters DAC51 to DAC54. The D/A converters DAC51 to DAC54 are respectively supplied with the signals D1 to D4. The D/A converters DAC51 to DAC54 output a pair of differential output signals according to the signals D1 to D4, respectively. At this time, the positive-phase output signals of the differential output signals output from the D/A converters DAC51 to DAC54 are respectively output to the phase modulation regions PM51_1 to PM51_4. The negative-phase output signals of the differential output signals output from the D/A converters DAC51 to DAC54 are respectively output to the phase modulation regions PM52_1 to PM52_4.

The differential output signals output from the D/A converters DAC51 to DAC54 will now be described. As mentioned above, the D/A converter DAC51 is a D/A converter which outputs five values (0, 1, 2, 3, and 4). Specifically, the DAC51 increases the value of the positive-phase output signal in the order of "0"->"1"->"2"->"3"->"4" in accordance with an increase in the value of the signal D1.

On the other hand, the DAC51 outputs an inverted signal of the positive-phase output signal as the negative-phase output signal. Specifically, the DAC51 increases the value of the negative-phase output signal in the order of "4"->"3"->"2"->"1"->"0" in accordance with an increase in the value of the signal D1. It can also be understood that the value of the negative-phase output signal is determined so that the sum of the values of the positive-phase output signal and the negative-phase output signal becomes equal to the maximum value "4" of the five output values.

FIG. 3 is an operation table showing operations of the optical transmitter 500. As the value of the input digital signals D[3:0] increases in the order of "0000"->"0001"->"0010"->"0011"->"0100", the D/A converter DAC51 increases the value of the positive-phase output signal in the order of "0"->"1"->"2"->"3"->"4" and decreases the value of the negative-phase output signal in the order of "4"->"3"->"2"->"1"->"0". In this case, however, when the value of the input digital signals D[3:0] is equal to or greater than "0101", the value of the positive-phase output signal of the D/A converter DAC51 is "4" and the value of the negative-phase output signal is "0".

As the value of the input digital signals D[3:0] increases in the order of "0100"->"0101"->"0110"->"0111"->"1000", the D/A converter DAC52 increases the value of the positive-phase output signal in the order of "0"->"1"->"2"->"3"->"4" and decreases the value of the negative-phase output signal in the order of "4"->"3"->"2"->"1"->"0". In this case, however, when the value of the input digital signals D[3:0] is equal to or smaller than "0011", the value of the positive-phase output signal of the D/A converter DAC52 is "0" and the value of the negative-phase output signal is "4". When the value of the input digital signals D[3:0] is equal to or greater than "1001", the value of the positive-phase output signal of the D/A converter DAC52 is "4" and the value of the negative-phase output signal is "0".

As the value of the input digital signals D[3:0] increases in the order of "1000"->"1001"->"1010"->"1011"->"1100", the D/A converter DAC53 increases the value of the positive-phase output signal in the order of "0"->"1"->"2"->"3"->"4" and decreases the value of the negative-phase output signal in the order of "4"->"3"->"2"->"1"->"0". In this case, however, when the value of the input digital signals D[3:0] is equal to or smaller than "0111", the value of the positive-phase output signal of the D/A converter DAC53 is "0" and the value of the negative-phase output signal is "4". When the value of the input digital signals D[3:0] is equal to or greater than "1101", the value of the positive-phase output signal of the D/A converter DAC53 is "4" and the value of the negative-phase output signal is "0".

As the value of the input digital signals D[3:0] increases in the order of "1100"->"1101"->"1110"->"1111", the D/A converter DAC54 increases the value of the positive-phase output signal in the order of "0"->"1"->"2"->"3" and decreases the value of the negative-phase output signal in the order of "4"->"3"->"2"->"1". In this case, however, when the value of the input digital signals D[3:0] is equal to or smaller than "1011", the value of the positive-phase output signal of the D/A converter DAC51 is "0" and the value of the negative-phase output signal is "4".

Figure 4:
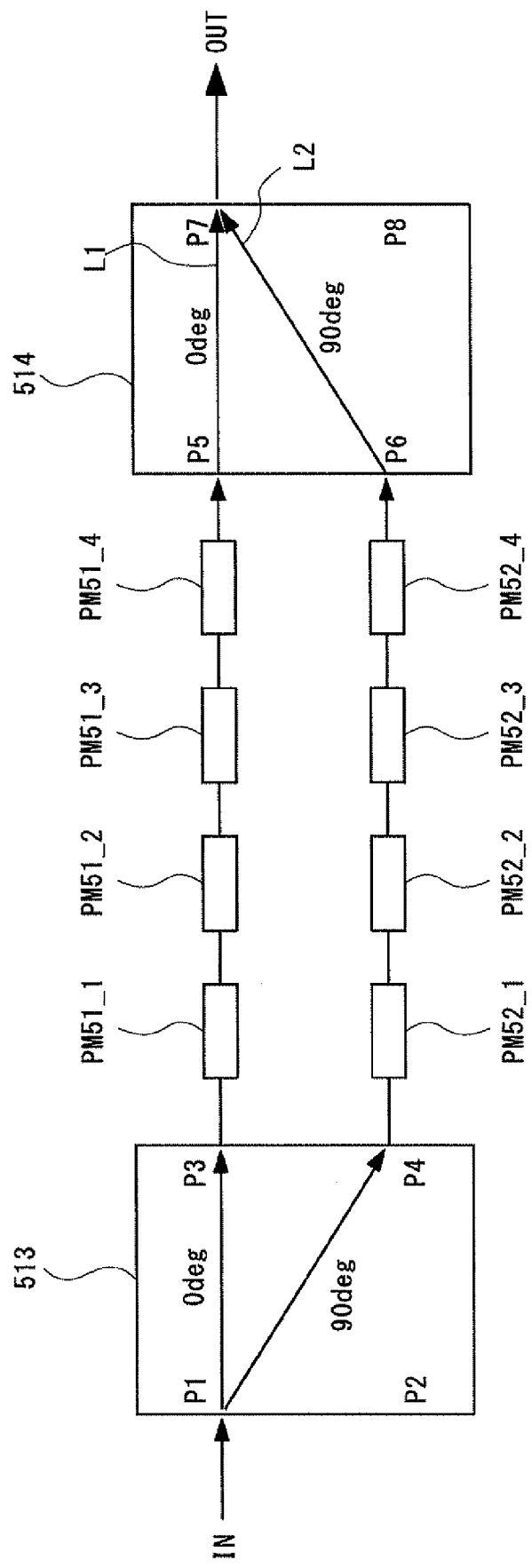
FIG. 4 is a diagram schematically showing a mode in which light propagates in the optical transmitter 500.

The phase modulation operation of the optical transmitter 500 will now be described. FIG. 4 is a diagram schematically showing a mode in which light propagates in the optical transmitter 500. In this example, as shown in FIG. 1, the input light IN is input to the input port P1 of the optical multiplexer/demultiplexer 513. Accordingly, the light output from the output port P4 has a phase that is delayed by 90° relative to the light output from the output port P3. After that, the light output from the output port P3 passes through the phase modulation regions PM51_1 to PM51_4 and reaches the input port P5 of the optical multiplexer/demultiplexer 514. The light which has reached the input port P5 directly reaches the output port P7. On the other hand, the light output from the output port P4 passes through the phase modulation regions PM52_1 to PM52_4 and reaches the input port P6 of the optical multiplexer/demultiplexer 514. The light which has reached the input port P6 has a phase that is further delayed by 90°, and reaches the output port P7.

In other words, light L2 which reaches the output port P7 from the input port P6 has a phase that is delayed by 180° relative to light L1 which reaches the output port P7 from the input port P5, even when the light L2 is not subjected to phase modulation by the phase modulation regions PM51_1 to PM51_4 and the phase modulation regions PM52_1 to PM52_4.

Figure 5A:
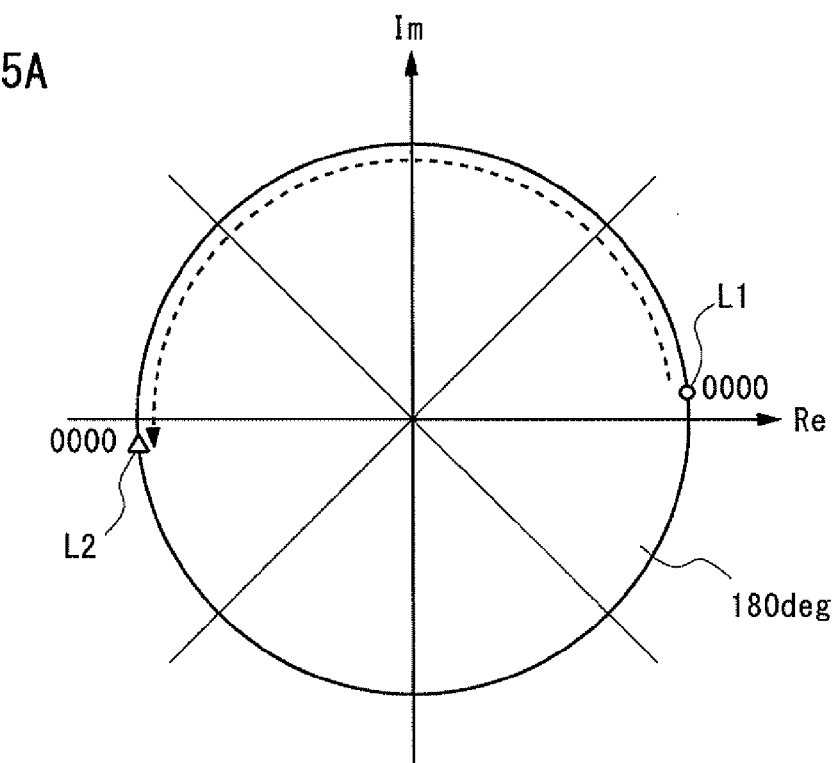
FIG. 5A is a constellation diagram showing light L1 and light L2 which are not subjected to phase modulation by phase modulation regions PM51_1 to PM51_4 and phase modulation regions PM52_1 to PM52_4.

FIG. 5A is a constellation diagram showing the light L1 and light L2 which are not subjected to phase modulation by the phase modulations regions PM51_1 to PM51_4 and the phase modulation regions PM52_1 to PM52_4. As described above, the light L2 which reaches the output port P7 from the input port P6 is delayed by 180° relative to the light L2 which reaches the output port P7 from the input port P5.

Figure 5B:
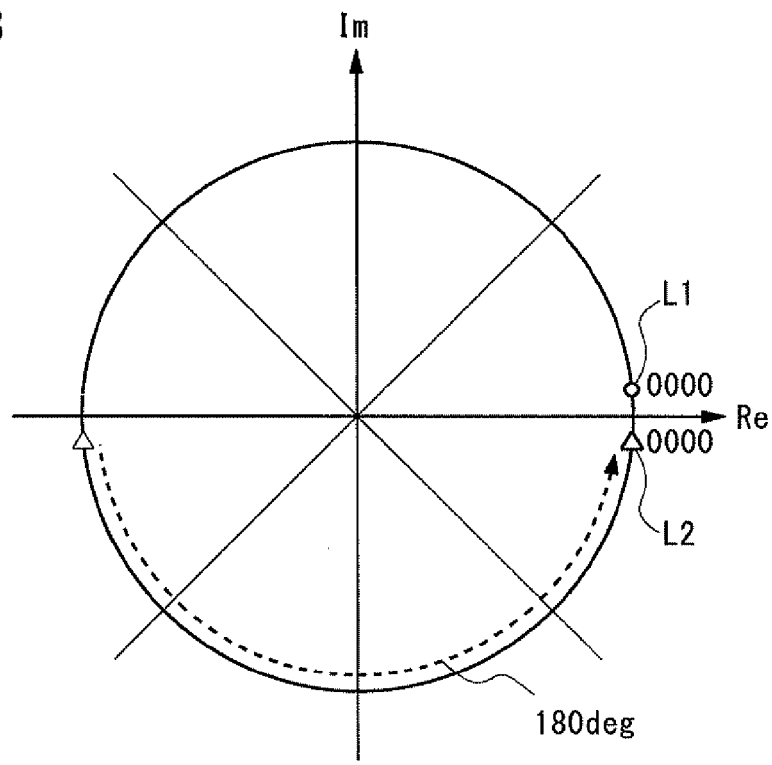
FIG. 5B is a constellation diagram showing the light L1 and light L2 when the binary code of an input digital signal is "0000" in the optical transmitter 500.

Meanwhile, in the optical transmitter 500, the positive-phase output signal is input to each of the phase modulation regions PM51_1 to PM51_4, and the negative-phase output signal is input to each of the phase modulation regions PM52_1 to PM52_4. Accordingly, the phase delay of the light L2 which reaches the output port P7 from the input port P6 is compensated. FIG. 5B is a constellation diagram showing the light L1 and light L2 when the binary code of the input digital signals D[3:0] is "0000" in the optical transmitter 500. For example, when the binary code of the input digital signals D[3:0] is "0000", the positive-phase output signal indicating "0" is input to each of the phase modulation regions PM51_1 to PM51_4, and the negative-phase output signal indicating "4" is input to each of the phase modulation regions PM52_1 to PM52_4. Accordingly, the phase of the light passing through the phase modulation regions PM52_1 to PM52_4 is further delayed by 180°.

That is, the phase delay of 180° generated due to the phase modulation regions PM52_1 to PM52_4, as well as the original phase delay of 180°, is added to the light L2 which reaches the output port P7 from the input port P6. Thus, a phase delay of 360° is generated in the light L2 which reaches the output port P7 from the input port P6, so that the phase delay with respect to the light L1, which reaches the output port P7 from the input port P5, is substantially eliminated. Furthermore, the value of the negative-phase output signal is decreased as the binary code of the input digital signals D[3:0] increases and the value of each of the positive-phase output signals output from the DAC51 to DAC54 increases.

Figure 5C:
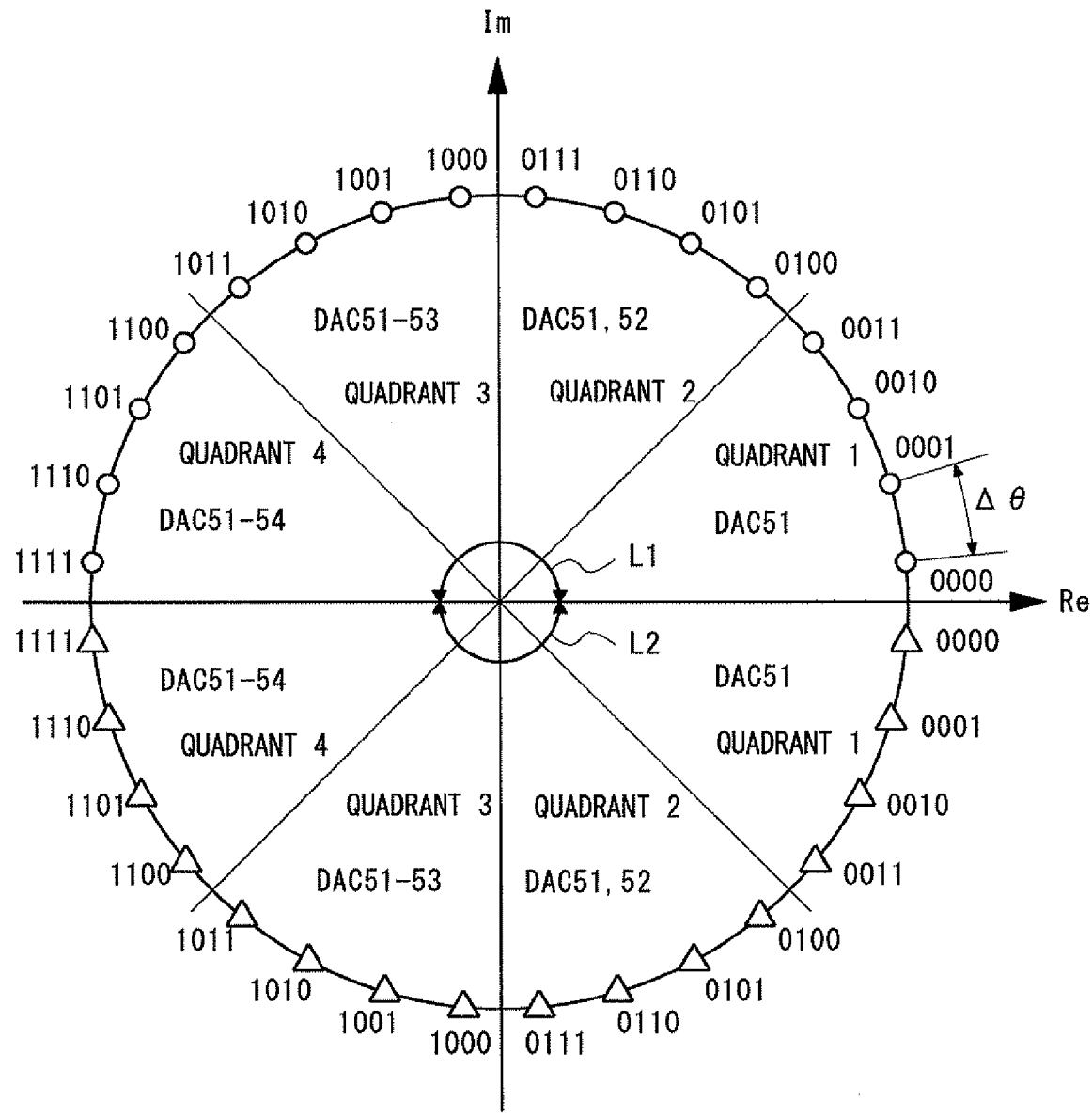
FIG. 5C is a constellation diagram showing the light L1 and light L2 in the optical transmitter 500.

FIG. 5C is a constellation diagram showing the light L1 and light L2 in the optical transmitter 500. As shown in FIG. 5C, when the differential output signals are used, the optical phases of the light L1 and the light L2 change symmetrically with respect to an Re axis, while the phase delay of the light L2, which reaches the output port P4 from the input port P1 and reaches the output port P7 from the input port P6, is compensated according to a change in the input digital signals D[3:0], thereby achieving an optical D/A conversion in the optical transmitter. With this configuration, the amount of phase modulation of the light L1 can be changed in 16 levels, i.e., 0 to 15 Δθ, and the amount of phase modulation of the light L2 can be changed in 16 levels, i.e., 0 to −15 Δθ, according to the value of the input digital signals D[3:0], as shown in the operation table of FIG. 3.

To facilitate understanding of the drawings, FIGS. 5B and 5C illustrate the positions of the light L1 and light L2 so as not to coincide with each other when the binary code of the input digital signals D[3:0] is "0000" or "1111". In other words, when the binary code of the input digital signals D[3:0] is "0000" or "1111", the positions of the light L1 and light L2 may coincide with each other. The case where the amount of variation in the phase that is modulated in the phase modulation regions varies in the range of 0 to 180 degrees according to the input digital signal has been described above, but the amount of phase variation is not limited to this range.

Figure 5D:
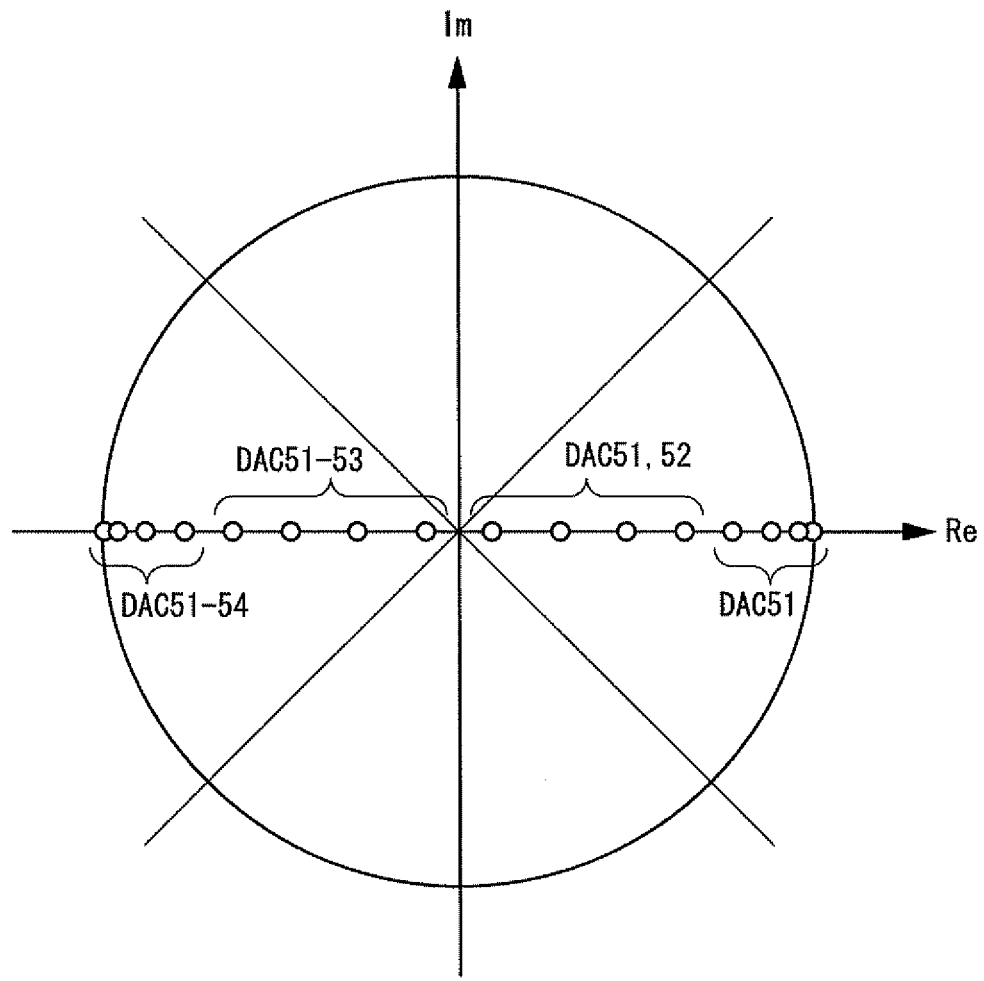
FIG. 5D is a constellation diagram showing the light intensity of output light OUT obtained by multiplexing the light L1 and light L2 in the optical transmitter 500.

The configuration described above allows the optical transmitter 500 to function as a 4-bit optical transmitter. However, if the levels of the phases of the light L1 and light L2, which are subjected to phase modulation by the drive circuit 53, are at regular intervals, the following problem arises. FIG. 5D is a constellation diagram showing the light intensity of the output light OUT obtained by multiplexing the light L1 and light L2 in the optical transmitter 500. As shown in FIG. 5D, when the phase of the optical signal is shifted at regular intervals, the interval between the levels of the light intensity of the output light is not uniform, which makes it difficult to ensure the linearity of the signal intensity of the output light with respect to the input digital signal.

First Exemplary Embodiment

Next, an optical transmitter 100 according to a first exemplary embodiment of the present invention will be described. The optical transmitter 100 is configured as an optical transmitter with a function to adjust linearity of signal intensity of output light to resolve the problem in the optical transmitter 500 described above. The optical transmitter 100 is a multi-level modulation optical transmitter. In this case, however, to simplify the explanation, the optical transmitter 100 will be described as a 4-bit optical transmitter. FIG. 6 is a block diagram schematically showing the configuration of the optical transmitter 100 according to the first exemplary embodiment. The optical transmitter 100 includes an optical modulator 11, a decoder 12, a drive circuit 13 and a control circuit 14.

The optical modulator 11 outputs output light OUT which is obtained by modulating input light IN. The optical modulator 11 includes optical waveguides 111 and 112, optical multiplexers/demultiplexers 113 and 114, and phase modulation regions PM11_1 to PM11_4 and PM12_1 to PM12_4. The optical waveguides 111 and 112 are arranged in parallel.

The optical multiplexer/demultiplexer 113 is disposed at the optical signal input (input light IN) side of the optical waveguides 111 and 112. The optical multiplexer/demultiplexer 114 is disposed at the optical signal output (output light OUT) side of the optical waveguides 111 and 112. The optical multiplexer/demultiplexer 113 has a configuration similar to that of the optical multiplexer/demultiplexer 513 described above. At the input side of the optical multiplexer/demultiplexer 113, the input light IN is input to the input port P1, and the input port P2 has no input. At the output side of the optical multiplexer/demultiplexer 113, the optical waveguide 111 is connected to the output port P3 and the optical waveguide 112 is connected to the output port P4.

The optical multiplexer/demultiplexer 114 is disposed at the optical signal output (output light OUT) side of the optical waveguides 111 and 112. The optical multiplexer/demultiplexer 114 has a configuration similar to that of the optical multiplexer/demultiplexer 514 described above. At the input side of the optical multiplexer/demultiplexer 114, the optical waveguide 111 is connected to the input port P5, and the optical waveguide 112 is connected to the input port P6. At the output side of the optical multiplexer/demultiplexer 114, the output light OUT is output from the output port P7.

The phase modulation regions PM11_1 to PM11_4 are arranged on the optical waveguide 111 between the optical multiplexer/demultiplexer 113 and the optical multiplexer/demultiplexer 114. The phase modulation regions PM12_1 to PM12_4 are arranged on the optical waveguide 112 between the optical multiplexer/demultiplexer 113 and the optical multiplexer/demultiplexer 114.

The phase modulation region includes an electrode formed on the optical waveguide as well as the optical transmitter 500. When an electric signal such as a voltage signal is applied to the electrode, the effective refractive index of the optical waveguide under the electrode changes. As a result, the substantial optical path length of the optical waveguide of the phase modulation region can be changed. Accordingly, the phase modulation region can change the phase of the optical signal propagating through the optical waveguide. Further, the optical signal can be modulated by applying a phase difference between the optical signals propagating through the two optical waveguides 111 and 112. That is, the optical modulator 11 forms a multilevel Mach-Zehnder optical modulator having two arms and an electrode segmented structure.

The drive circuit 13 includes five-level D/A converters DAC1 to DAC4. The D/A converters DAC1 to DAC4 have the same number of levels as each other. Each of the D/A converters DAC1 to DAC4 is configured to be capable of independently adjusting full-scale amplitude FSA.

The decoder 12 decodes 4-bit digital signals D[3:0], and outputs signals D1 to D4 to the D/A converters DAC1 to DAC4 in the drive circuit 13, respectively.

Figure 7:
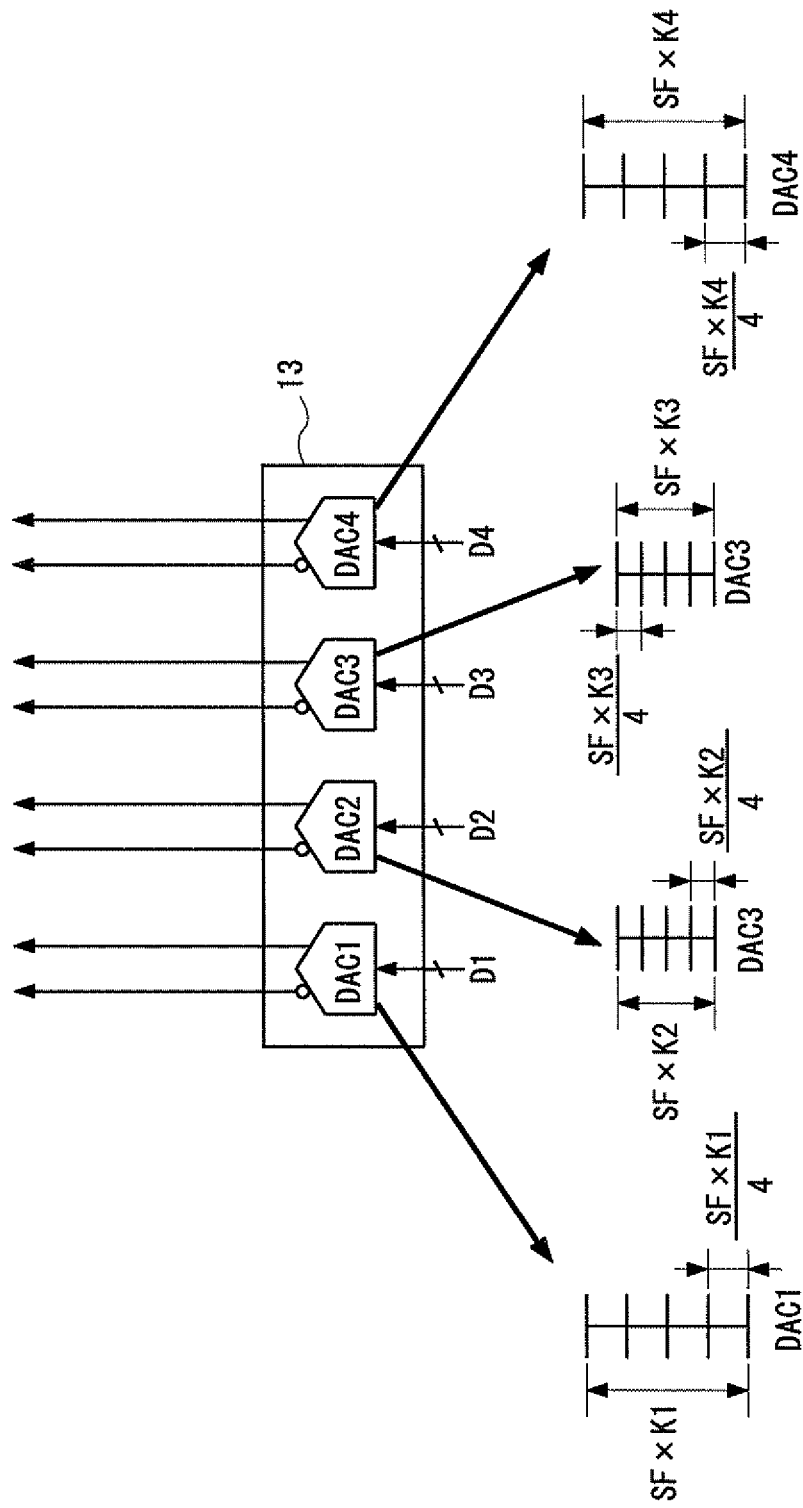
FIG. 7 is a diagram schematically showing full-scale amplitudes of the D/A converters DAC1 to DAC4.

The control circuit 14 sets full-scale amplitudes of the D/A converters DAC1 to DAC4. Specifically, the control circuit 14 decides coefficients K1 to K4 which the D/A converters DAC1 to DAC4 multiplied to output values thereof, respectively. FIG. 7 is a diagram schematically showing the full-scale amplitudes of the D/A converters DAC1 to DAC4. In this example, the control circuit 14 sets the full-scale amplitudes of the D/A converters DAC1 and DAC4 to be larger than those of the D/A converters DAC2 and DAC3.

FIG. 8 is an operation table showing operations of the optical transmitter 100 according to the first exemplary embodiment. The D/A converters DAC1 and DAC4 output pairs of differential output signals according to the signals D1 to D4, respectively. At this time, the positive-phase output signals of the differential output signals output from the D/A converters DAC1 and DAC4 are respectively output to the phase modulation regions PM11_1 to PM11_4. The negative-phase output signals of the differential output signals output from the D/A converters DAC1 to DAC4 are respectively output to the phase modulation regions PM12_1 to PM12_4.

Outputs of the D/A converters DAC1 to DAC4 are five-level. In sum, the full-scale of the D/A converters DAC1 to DAC4 are values in which the coefficients K1 to K4 are multiplied to a standard full-scale amplitude SF. The width of levels of each of the D/A converters DAC1 to DAC4 is (SF×Kx/4) (1≤x≤4). Note that, in FIG. 8, it is described that Wx=SF×Kx/4.

The D/A converters DAC1 to DAC4 respectively increase the values of the positive-phase output signals in the order of "0 (0×SF×Kx/4)"->"1×SF×Kx/4"->"2×SF×Kx/4"->"3×SF×Kx/4"->"SF×Kx" according to the signals D1 to D4.

Meanwhile, the D/A converters DAC1 to DAC4 output signals, which are inverted signals of the positive-phase signals, as the negative-phase signals. The D/A converters DAC1 to DAC4 respectively increase the values of the positive-phase output signals in the order of "SF×Kx"->"3×SF×Kx/4"->"2×SF×Kx/4"->"1×SF×Kx/4"->"0 (0×SF×Kx/4)" according to the signals D1 to D4.

Note that, it is possible to understand that the value of the negative-phase signal is decided to cause the sum of values of the positive-phase signal and negative-phase signal to equals to the maximum value "SF×Kx".

Specifically, as the value of the input digital signals D[3:0] increases in the order of "0000"->"0001"->"0010"->"0011"->"0100", the D/A converter DAC1 increases the value of the positive-phase output signal in the order of "0 (0×SF×Kx/4)"->"1×SF×Kx/4"->"2×SF×Kx/4"->"3×SF×Kx/4"->"SF×Kx". Meanwhile, as the value of the input digital signals D[3:0] increases in the order of "0000"->"0001"->"0010"->"0011"->"0100", the D/A converter DAC1 decreases the value of the negative-phase output signal in the order of "SF×Kx"->"3×SF×Kx/4"->"2×SF×Kx/4"->"1×SF×Kx/4"->"0 (0×SF×Kx/4)". In this case, however, when the input digital signals D[3:0] is equal to or larger than "0101", the D/A converter DAC1 outputs "SF×Kx" as the positive-phase output signal, and outputs "0" as the negative-phase output signal.

As the value of the input digital signals D[3:0] increases in the order of "0100"->"0101"->"0110"->"0111"->"1000", the D/A converter DAC2 increases the value of the positive-phase output signal in the order of "0 (0×SF×Kx/4)"->"1×SF×Kx/4"->"2×SF×Kx/4"->"3×SF×Kx/4"->"SF×Kx". Meanwhile, as the value of the input digital signals D[3:0] increases in the order of "0100"->"0101"->"0110"->"0111"->"1000", the D/A converter DAC2 decreases the value of the negative-phase output signal in the order of "SF×Kx"->"3×SF×Kx/4"->"2×SF×Kx/4"->"1×SF×Kx/4"->"0 (0×SF×Kx/4)". In this case, however, when the input digital signals D[3:0] is equal to or smaller than "0011", the D/A converter DAC2 outputs "0" as the positive-phase output signal, and outputs "SF×Kx" as the negative-phase output signal. When the input digital signals D[3:0] is equal to or larger than "1001", the D/A converter DAC2 outputs "SF×Kx" as the positive-phase output signal, and outputs "0" as the negative-phase output signal.

As the value of the input digital signals D[3:0] increases in the order of "1000"->"1001"->"1010"->"1011"->"1100", the D/A converter DAC3 increases the value of the positive-phase output signal in the order of "0 (0×SF×Kx/4)"->"1× SF×Kx/4"->"2×SF×Kx/4"->"3×SF×Kx/4"->"SF×Kx". Meanwhile, as the value of the input digital signals D[3:0] increases in the order of "1000"->"1001"->"1010"->"1011"->"1100", the D/A converter DAC3 decreases the value of the negative-phase output signal in the order of "SF×Kx"->"3× SF×Kx/4"->"2×SF×Kx/4"->"1×SF×Kx/4"->"0 (0×SF×Kx/4)". In this case, however, when the input digital signals D[3:0] is equal to or smaller than "0111", the D/A converter DAC3 outputs "0" as the positive-phase output signal, and outputs "SF×Kx" as the negative-phase output signal. When the input digital signals D[3:0] is equal to or larger than "1101", the D/A converter DAC3 outputs "SF×Kx" as the positive-phase output signal, and outputs "0" as the negative-phase output signal.

As the value of the input digital signals D[3:0] increases in the order of "1100"->"1101"->"1110"->"1111", the D/A converter DAC4 increases the value of the positive-phase output signal in the order of "0 (0×SF×Kx/4)"->"1×SF×Kx/4"->"2×SF×Kx/4"->"3×SF×Kx/4". Meanwhile, as the value of the input digital signals D[3:0] increases in the order of "1100"->"1101"->"1110"->"1111", the D/A converter DAC4 decreases the value of the negative-phase output signal in the order of "SF×Kx"->"3×SF×Kx/4"->"2×SF×Kx/4"->"1×SF×Kx/4". In this case, however, when the input digital signals D[3:0] is equal to or smaller than "1011", the D/A converter DAC4 outputs "0" as the positive-phase output signal, and outputs "SF×Kx" as the negative-phase output signal.

Figure 9A:
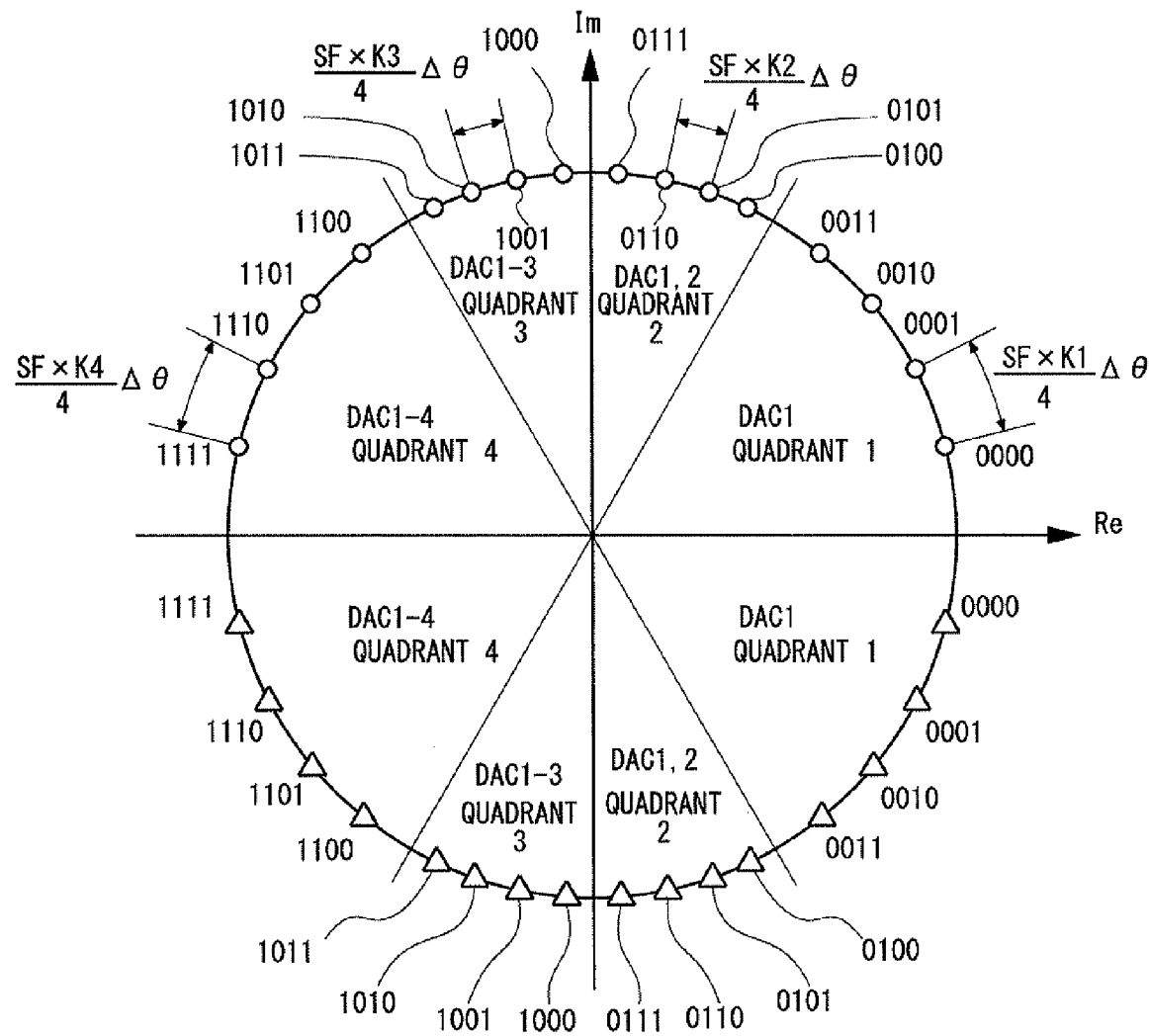
FIG. 9A is a constellation diagrams showing modulating operation of the optical transmitter 100 according to the first embodiment.
Figure 9B:
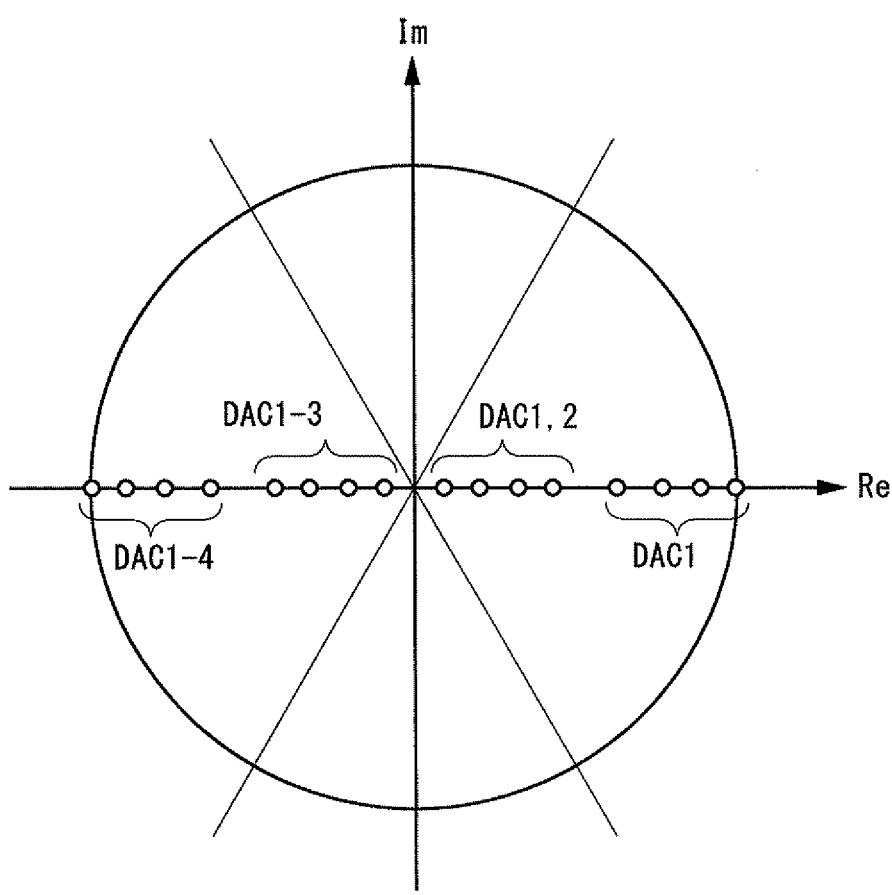
FIG. 9B is a constellation diagrams showing modulating operation of the optical transmitter 100 according to the first embodiment.

FIGS. 9A and 9B are constellation diagrams showing modulating operation of the optical transmitter 100 according to the first embodiment. As shown in FIG. 9A, the D/A converter DAC1 can change a phase modulation amount of a light L1 by $\{(SF×K1/4)\Delta\theta\}$, and a phase modulation amount of a light L2 by $\{(-SF×K1/4)\Delta\theta\}$. The D/A converter DAC2 can change a phase modulation amount of a light L1 by $\{(SF×K2/4)\Delta\theta\}$, and a phase modulation amount of a light L2 by $\{(-SF×K2/4)\Delta\theta\}$. The D/A converter DAC3 can change a phase modulation amount of a light L1 by $\{(SF×K3/4)\Delta\theta\}$, and a phase modulation amount of a light L2 by $\{(-SF×K3/4)\Delta\theta\}$. The D/A converter DAC4 can change a phase modulation amount of a light L1 by $\{(SF×K4/4)\Delta\theta\}$, and a phase modulation amount of a light L2 by $\{(-SF×K4/4)\Delta\theta\}$.

In this example, K1=K4>K3=K3, so that the full-scale amplitudes are larger than those of the D/A converters DAC2 and DAC3. Therefore, phase variations caused by the D/A converters DAC1 and DAC4 are larger than those of the D/A converters DAC2 and DAC3.

That is, values of phase modulation at the arms can be uneven, by decreasing the full-scale amplitude of the D/A converter, which is in charge of the levels near the center level of the output light, and increasing the full-scale amplitude of the D/A converter, which is in charge of the levels away from the center level of the output light. As a result, as shown in FIG. 9B, the levels of the signal intensity of the output light can be further even.

In sum, compared to the case of varying the phase at equal intervals as the optical transmitter 500, the optical transmitter 100 can further uniformize the level interval of the signal intensity of the output light. As described above, according to this configuration, it is possible to provide the optical transmitter that can adjust the linearity of the signal intensity of the output light. In FIGS. 9A and 9B, the number of the DAC serving as the drive circuit is limited to four to simplify the explanation, and the levels of the signal intensity do not completely even. However, even modulation of the levels of the signal intensity which is close to ideal can be performed by expanding the number of drive DACs and the levels of the DAC.

Second Exemplary Embodiment

Next, an optical transmitter 200 according to a second exemplary embodiment of the present invention will be described. The optical transmitter 200 is an alternative of the optical transmitter 100 according to the first exemplary embodiment. FIG. 10 is a block diagram schematically showing the configuration of the optical transmitter 200 according to the second exemplary embodiment. The optical transmitter 200 has a structure in which a memory device 15 is added to the optical transmitter 100 according to the first exemplary embodiment.

A memory device 15 includes a full-scale amplitude setting table 16. The control circuit 14 reads the full-scale amplitude setting table 16 stored in the memory device 15, and adjusts the full-scale amplitudes of the D/A converters DAC1 to DAC4 based on full-scale amplitude setting information of the full-scale amplitude setting table 16.

The full-scale amplitude setting table 16 may be fixed values stored in the memory device 15 in advance. The full-scale amplitude setting table 16 may be input to the memory device 15 from the outside as initial setting information for installing the optical transmitter 200 to an optical transmission/reception system. Further, the full-scale amplitude setting table 16 in the memory device 15 may be updated from the outside, while the optical transmitter 200 outputs the optical signal.

According to this configuration, the control circuit 14 refers to the full-scale amplitude setting table 16. Then, the control circuit 14 can set each of the full-scale amplitudes of the D/A converters DAC1 to DAC4 as appropriate.

Third Exemplary Embodiment

Next, an optical transmitter 300 according to a third exemplary embodiment of the present invention will be described. The optical transmitter 300 is an alternative of the optical transmitter 100 according to the first exemplary embodiment. FIG. 11 is a block diagram schematically showing the configuration of the optical transmitter 300 according to the third exemplary embodiment. The optical transmitter 300 has a structure in which an optical monitoring circuit 17 and an arithmetic device 18 are added to the optical transmitter 100 according to the first exemplary embodiment.

The optical monitoring circuit 17 monitors the output light OUT of the optical modulator 11 and detects the light intensity of the output light OUT. Then, the optical monitoring circuit 17 outputs a detection signal $S_d$, which corresponds to the detected light intensity, to the arithmetic device 18.

The arithmetic device 18 calculates a difference between the light intensity of the output light OUT obtained from the detection signal $S_d$ and an expectation value of light intensity corresponding to the input digital signal D[3:0]. Then, an adjustment instruction signal $S_o$ corresponding to the calculated difference is output to the control circuit 14. The adjustment instruction signal $S_o$ includes information for indicating the D/A converter to be adjusted and a setting value of the full-scale amplitude of the indicated D/A converter.

The control circuit 14 sets the full-scale amplitudes of the D/A converters DAC1 to DAC4 according to conditions indicated by the adjustment instruction signal $S_o$.

According to this configuration, it is possible to set the full-scale amplitudes of the D/A converters DAC1 to DAC4 to optimal values with monitoring the actual light intensity of the output light OUT. Therefore, it is possible to provide an optical transmitter that can precisely adjust the linearity of the signal intensity of the output light OUT.

Fourth Exemplary Embodiment

Figure 12:
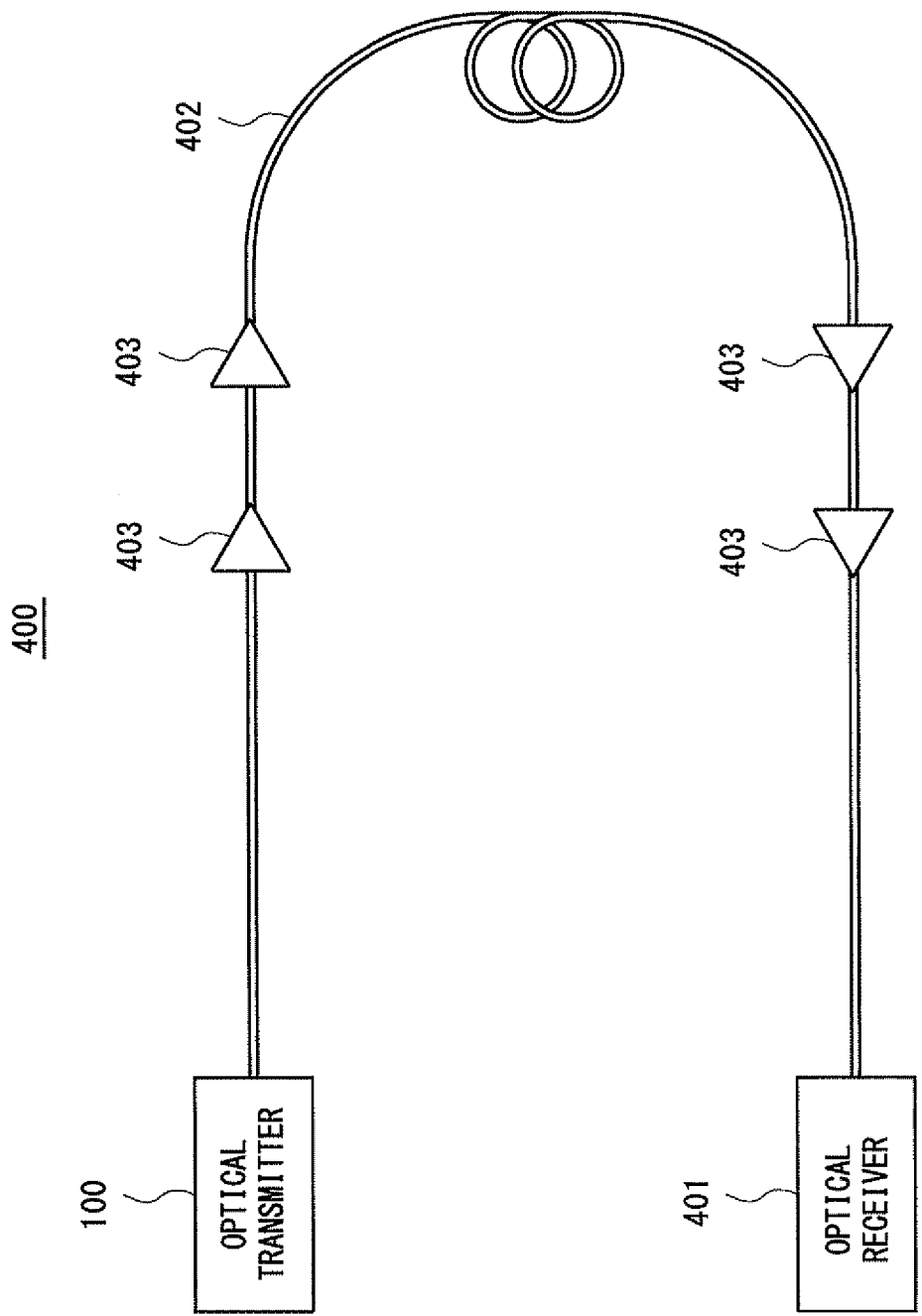
FIG. 12 is a block diagram schematically showing the configuration of an optical transmission/reception system 400 according to a fourth exemplary embodiment.

Next, an optical transmission/reception system 400 according to a fourth exemplary embodiment of the present invention will be described. The optical transmission/reception system 400 is an optical transmission/reception system using one of the above-described optical transmitters 100, 200, and 300. An example in which the optical transmission/reception system 400 includes the optical transmitter 100 will now be described. FIG. 12 is a block diagram schematically showing the configuration of the optical transmission/reception system 400 according to the fourth exemplary embodiment.

The optical transmission/reception system 400 includes the optical transmitter 100, an optical receiver 401, a transmission line 402, and optical amplifiers 403.

The optical transmitter 100 outputs, as an optical signal, a QPSK optical signal which is obtained by performing, for example, quadrature phase shift keying (hereinafter referred to as "QPSK").

The optical transmitter 100 and the optical receiver 401 are optically connected via the transmission line 402, and the QPSK optical signal propagates therethrough. The optical amplifiers 403 are disposed on the transmission line 402, and amplify the QPSK optical signal propagating through the transmission line 402. The optical receiver 401 demodulates the QPSK optical signal into an electric signal.

The configuration described above allows the optical transmission/reception system 400 to transmit the optical signal by using the optical transmitter 100. The optical transmitter 100 can be replaced by the optical transmitter 100 or 200, as a matter of course.

Fifth Exemplary Embodiment

Next, a fifth exemplary embodiment of the present invention will be described. In the first to third exemplary embodiments described above, the examples in which the linearity of the signal intensity of the output light is improved are described. However, a method for adjusting the linearity of the signal intensity of the output light is not limited to the above-described method. In this exemplary embodiment, another method for adjusting the linearity of the signal intensity of the output light, which uses the optical transmitter 100, 200 and 300 according to the first to third exemplary embodiments, will be described.

For example, in an optical transmission/reception system or the like, pre-equalization operation on an optical signal output from an optical transmitter may be performed when performing a long-distance transmission. In this case, in the optical signal on which the pre-equalization operation is performed, probability of occurrence of a component having medium level amplitude is large. In this case, the component the probability of occurrence of which is large is precisely operated, and the component the probability of occurrence of which is small is roughly operated, so that a signal can be processed using a small number of bits.

Figure 13:
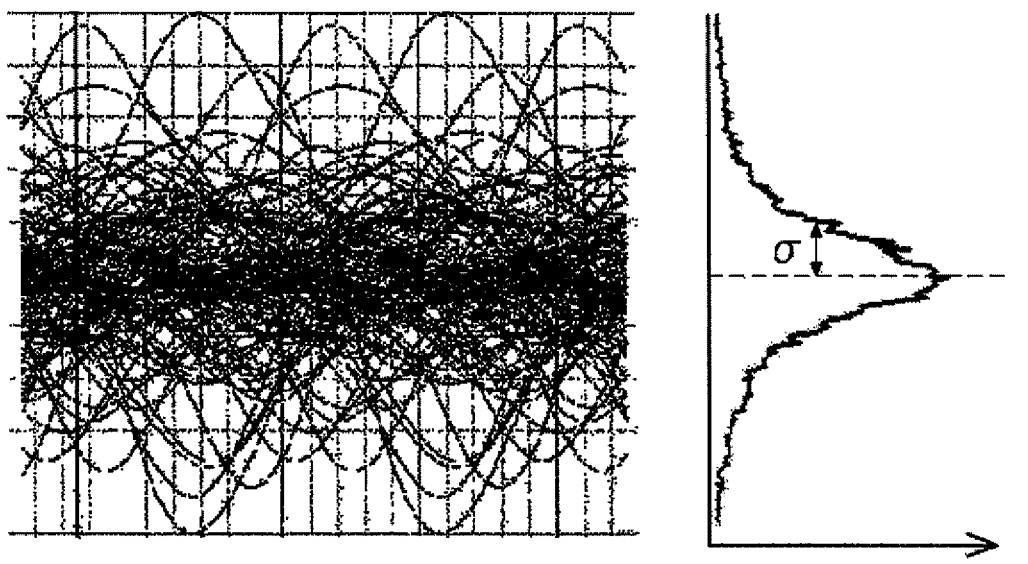
FIG. 13 is a diagram showing a waveform and the probability of occurrence of the optical signal on which the pre-equalization operation is performed.

FIG. 13 is a diagram showing a waveform and the probability of occurrence of the optical signal on which the pre-equalization operation is performed. When optical signal processing of 4-bit level is performed on the pre-equalization signal such as shown in FIG. 13, the probability of occurrence in the vicinity of the signal center, or in the vicinity of "1000", is large. Meanwhile, the probabilities of occurrence at both ends of the signal, or in the vicinities of "0000" and "1111" are small.

Figure 14A:
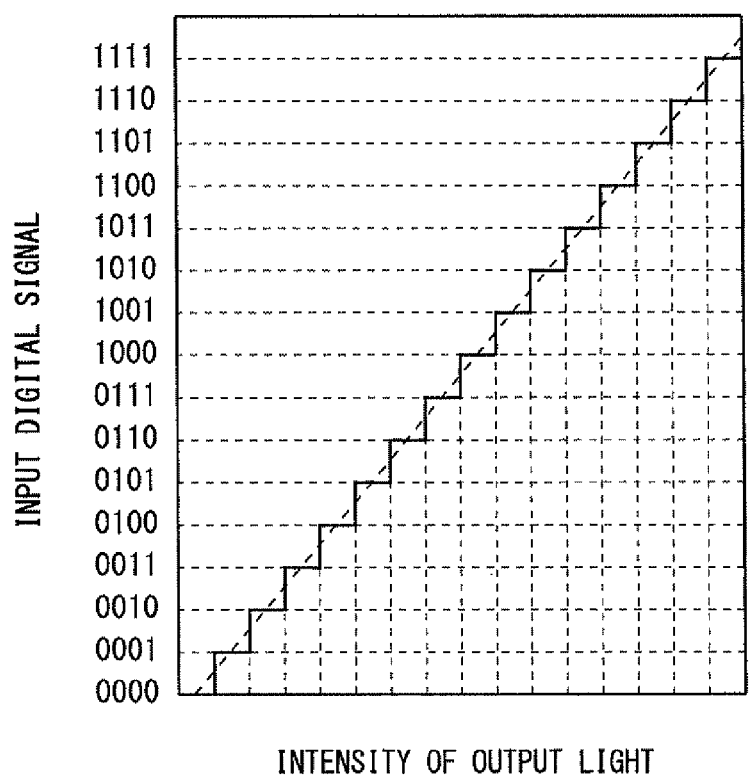
FIG. 14A is a graph showing level variation of 4-bit output light having general linear characteristics.
Figure 14B:
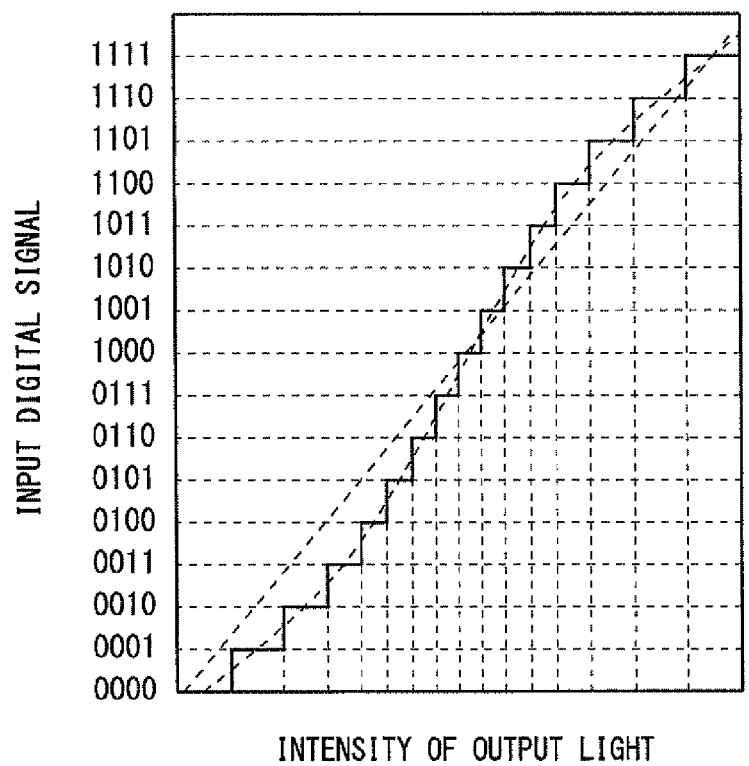
FIG. 14B is a graph showing level variation of 4-bit output light having non-linear characteristics in which a level width in the vicinity of "1000" is narrow.

FIG. 14A is a graph showing level variation of 4-bit output light having general linear characteristics. FIG. 14B is a graph showing level variation of 4-bit output light having non-linear characteristics in which a level width in the vicinity of "1000" is narrow. As shown in FIG. 14B, not quantization having the linear condition characteristics shown in FIG. 14B, but quantization having the non-linear characteristics in which the level width at the vicinity of "1000" is narrow shown in FIG. 12B is performed on the level variation of the output light, so that the processing in the vicinity of "1000" can be precisely performed. As a result, a precise signal processing can be performed by providing the non-linear characteristics such as shown in FIG. 14B to the same 4-bit level, when the signal shown in FIG. 13 is treated.

Thus, the adjusting method of the present invention is applied for a use in which the non-linear characteristics are purposely provided to the signal, and the linearity of the signal intensity of the output light can be adjusted. Therefore, the non-linear characteristics shown in FIG. 13 are provided to the output light OUT by the optical transmitters 100, 200, and 300 according to the first to third exemplary embodiments, and it is possible to decrease processing bits and achieve a precise processing depending on a communication method.

Other Exemplary Embodiment

The present invention is not limited to the above exemplary embodiments, and can be modified as appropriate without departing from the scope of the invention. For example, since the optical phase variations can be added regardless of the order of variations, setting the full-scale amplitude is not limited to the above-described examples. In other words, the order of the D/A converters DAC1 to DAC4 can be arbitrarily changed.

In the above exemplary embodiments, the optical transmitters 100, 200 and 300 are described as 4-bit optical transmitters, but these are illustrated by way of example only. That is, an optical transmitter capable of higher-order multilevel modulation can be configured by increasing the number of phase modulation regions (segmented electrodes), the number of D/A converters, and the number of levels.

In the third exemplary embodiment, the example in which the light intensity of the output light is monitored and the full-scale amplitude of the D/A converter is controlled, but this is illustrated by way of example only. That is, a configuration in which the light intensity of the output light is monitored by the optical receiver and the optical receiver feeds back light intensity information to the optical transmitter may be provided. The arithmetic device 18 can be incorporated into the optical transmitter.

While the present invention has been described with reference to exemplary embodiments, the present invention is not limited to the above-described exemplary embodiments. The configuration and details of the present invention can be modified in various manners which can be understood by those skilled in the art within the scope of the invention.

This application is based upon and claims the benefit of priority from Japanese patent application No. 2012-064768, filed on Mar. 22, 2012, the disclosure of which is incorporated herein in its entirety by reference.

REFERENCE SIGNS LIST 11, 51 OPTICAL MODULATORS
12, 52 DECODER 13, 53 DRIVE CIRCUITS
14 CONTROL CIRCUIT
15 MEMORY DEVICE
16 FULL-SCALE AMPLITUDE SETTING TABLE
17 OPTICAL MONITORING CIRCUIT
18 ARITHEMETIC DEVICE
100, 200, 300, 500 OPTICAL TRANSMITTERS
400 OPTICAL TRANSMISSION/RECEPTION SYSTEM
401 OPTICAL RECEIVER
402 TRANSMISSION LINE
403 OPTICAL AMPLIFIER
111, 112, 511, 512 OPTICAL WAVEGUIDES
113, 114, 513, 514 OPTICAL MULTIPLEXERS/DEMULTIPLEXERS
DAC1-DAC4, DAC51-DAC54 D/A CONVERTERS
OUT OUTPUT LIGHT
PM11_1-PM11_4, PM12_1-PM12_4, PM51_1-51_4, PM52_1-52_4 PHASE MODULATION REGIONS
$S_d$ DETECTION SIGNAL
$S_o$ ADJUSTMENT INSTRUCTION SIGNAL

The invention claimed is:

1. An optical transmitter comprising:
an optical modulator that includes an optical transmission line through which an optical signal propagates, a plurality of phase modulation regions being formed on the optical transmission line;
a decoder that decodes an input digital signal and outputs a signal according to a decoded value;
a drive circuit that outputs a drive signal to the each of the plurality of phase modulation regions based on the signal according to a decoded value, level of the drive signal being equal to or more than three; and
a control circuit that adjusts full-scale amplitudes of the plurality of the drive signals by controlling the drive circuit.

2. The optical transmitter according to claim 1, wherein the control circuit controls the drive circuit to cause the full-scale amplitude of the drive signal, in the plurality of the drive signals, output to the phase modulation region to be smaller, a level of modulating of the phase modulation region is closer to the center of the number of modulation levels represented by the input digital signal.

3. The optical transmitter according to claim 1, wherein the control circuit controls the drive circuit to cause the full-scale amplitude of the drive signal, in the plurality of the drive signals, output to the phase modulation region to be smaller, probability of occurrence of a level of the phase modulation region is larger in the number of modulation levels represented by the input digital signal.

4. The optical transmitter according to claim 1, wherein
the drive circuit includes a plurality of the multi-level DACs that output the drive signal to each of the plurality of the phase modulation region, and
the control circuit adjusts full-scale amplitudes of the plurality of the multi-level DACs.

5. The optical transmitter according to claim 4, further comprising a memory device in which setting information of the full-scale amplitude of each of the plurality of the multi-level DACs, wherein
the control circuit adjusts the full-scale amplitude of each of the plurality of the multi-level DACs based on the setting information of the full-scale amplitude.

6. The optical transmitter according to claim 4, further comprising:
an optical monitoring circuit that detects light intensity of output light from the optical modulator; and
an arithmetic device that outputs an adjustment instruction signal based on difference between the light intensity detected by the optical monitoring circuit and an expectation value of light intensity obtained from the input digital signal, wherein
the control circuit adjusts the full-scale amplitude of each of the plurality of the multi-level DACs based on the adjustment instruction signal.

7. An optical transmission/reception system comprising:
an optical transmitter that transmits an optical signal;
a transmission line in which the optical signal propagates;
an optical receiver that receives the optical signal through the transmission line; wherein
the optical transmitter comprises:
an optical modulator that includes an optical transmission line through which the optical signal propagates, a plurality of phase modulation regions being formed on the optical transmission line;
a decoder that decodes an input digital signal and outputs a signal according to a decoded value;
a drive circuit that outputs a drive signal to the each of the plurality of phase modulation regions based on the signal according to a decoded value, level of the drive signal being equal to or more than three; and
a control circuit that adjusts full-scale amplitudes of the plurality of the drive signals by controlling the drive circuit.

8. The optical transmission/reception system according to claim 7, wherein the control circuit controls the drive circuit to cause the full-scale amplitude of the drive signal, in the plurality of the drive signals, output to the phase modulation region to be smaller, a level of modulating of the phase modulation region is closer to the center of the number of modulation levels represented by the input digital signal.

9. The optical transmission/reception system according to claim 7, wherein the control circuit controls the drive circuit to cause the full-scale amplitude of the drive signal, in the plurality of the drive signals, output to the phase modulation region to be smaller, probability of occurrence of a level of the phase modulation region is larger in the number of modulation levels represented by the input digital signal.

10. The optical transmission/reception system according to claim 7, wherein
the drive circuit includes a plurality of the multi-level DACs that output the drive signal to each of the plurality of the phase modulation region, and
the control circuit adjusts full-scale amplitudes of the plurality of the multi-level DACs.

11. The optical transmission/reception system according to claim 10, further comprising a memory device in which setting information of the full-scale amplitude of each of the plurality of the multi-level DACs, wherein
the control circuit adjusts the full-scale amplitude of each of the plurality of the multi-level DACs based on the setting information of the full-scale amplitude.

12. The optical transmission/reception system according to claim 10, further comprising:
an optical monitoring circuit that detects light intensity of output light from the optical modulator; and
an arithmetic device that outputs an adjustment instruction signal based on difference between the light intensity detected by the optical monitoring circuit and an expectation value of light intensity obtained from the input digital signal, wherein the control circuit adjusts the full-scale amplitude of each of the plurality of the multi-level DACs based on the adjustment instruction signal.

* * * * *